(12) United States Patent
Sasaki et al.

(10) Patent No.: US 8,025,137 B2
(45) Date of Patent: Sep. 27, 2011

(54) POWER TRANSFER/TRANSMISSION APPARATUS

(76) Inventors: Susumu Sasaki, Tochigi (JP); Atsushi Tamura, Tochigi (JP); Isao Hirota, Tochigi (JP)

( * ) Notice: Subject to any disclaimer, the term of this patent is extended or adjusted under 35 U.S.C. 154(b) by 682 days.

(21) Appl. No.: 12/150,973

(22) Filed: May 2, 2008

(65) Prior Publication Data

US 2008/0283351 A1 Nov. 20, 2008

(30) Foreign Application Priority Data

May 18, 2007 (JP) ................................ 2007-132400
Dec. 20, 2007 (JP) ................................ 2007-329134

(51) Int. Cl.
*F16H 48/12* (2006.01)
*F16D 27/115* (2006.01)

(52) U.S. Cl. ........... 192/48.2; 74/650; 192/49; 192/84.7

(58) Field of Classification Search ...................... 192/49
See application file for complete search history.

(56) References Cited

U.S. PATENT DOCUMENTS

| 5,845,546 | A | * | 12/1998 | Knowles et al. ................ 74/650 |
| 6,837,351 | B2 | * | 1/2005 | Showalter et al. ........... 192/84.7 |
| 6,880,688 | B2 | * | 4/2005 | Matsumoto ................ 192/84.91 |
| 6,905,008 | B2 | * | 6/2005 | Kowalsky et al. ........... 192/48.2 |
| 2003/0066727 | A1 | * | 4/2003 | Suzuki .......................... 192/84.7 |
| 2004/0118653 | A1 | * | 6/2004 | Ochiai et al. ................ 192/84.91 |

FOREIGN PATENT DOCUMENTS

| EP | 0869299 | 10/1998 |
| JP | 9-328021 | 12/1997 |

* cited by examiner

*Primary Examiner* — Rodney Bonck

(57) ABSTRACT

A power transfer/transmission apparatus includes clutch adjusting mechanisms that are easy to assemble and are stably supported, the power transfer/transmission apparatus has a clutch housing, the clutch housing includes a vertical wall (a flange and a vertical wall) connected to a joint shaft and a peripheral wall connected to the vertical wall and enclosing a main clutch, the flange has an output unit support that rotatably supports a first end of a clutch output unit at a position that is axially different from the position of the joint shaft, a second end of the clutch output unit includes a centering part that forms a hollow axle joint having inner splines engaged with an axle so that the axle joint and axle may rotate together.

6 Claims, 12 Drawing Sheets

US 8,025,137 B2

POWER TRANSFER/TRANSMISSION APPARATUS

BACKGROUND OF THE INVENTION

1. Field of the Invention

The present invention relates to a power transfer/transmission apparatus for a vehicle.

2. Description of Related Art

An example of a power transfer/transmission apparatus for a vehicle is a differential gear provided with two adjusting clutches disclosed in Japanese Unexamined Patent Application Publication No. 09-328021.

This apparatus employs a pair of gears arranged on different axial lines and meshing with each other, to receive driving power from an engine and transmit the driving power to a cylindrical drive unit. Ends of the cylindrical drive unit are connected to the clutches, respectively. The clutches are engaged/disengaged to transfer the driving power to left and right wheels.

Each of the clutches has a bell-shaped member to receive the driving power from the cylindrical drive unit. The bell-shaped member has gear teeth formed on an inner circumferential face thereof. These gear teeth mesh with gear teeth formed on an outer circumferential face of the cylindrical drive unit in a manner like spline coupling. Namely, each clutch is supported only at an end of the cylindrical drive unit through the meshed gears of the bell-shaped member and cylindrical drive unit. This support configuration is unstable and may cause unbalanced rotation of the bell-shaped members to badly affect the engagement/disengagement of the clutches.

The cylindrical drive unit supports, on the center axis side thereof, an end of an outer circumferential face of an output member for driving an axle. Namely, the cylindrical drive unit receives therein an end of the output member, and at the same time, supports thereon an end of the bell-shaped member. This configuration must involve a complicated assembling work.

Each of the clutches has a clutch collar. The clutch collar has gear teeth on an inner circumferential face thereof and the gear teeth mesh with gear teeth formed on an outer circumferential face of the output member in a manner like spline coupling. As mentioned above, an end of the output member is inserted into and supported by the cylindrical drive unit, and therefore, the supporting of the clutch collar by the output member becomes unstable in a radial direction. This results in causing unbalanced rotation of the bell-shaped members to badly affect the engagement/disengagement of the clutches.

SUMMARY OF THE INVENTION

An object of the present invention is to provide a power transfer/transmission apparatus, having clutch adjusting mechanisms that are stable and easy to assemble.

In order to accomplish the object, an aspect of the present invention provides a power transfer/transmission apparatus having an input gear unit and an output gear unit that are rotatably supported with bearings on a stationary carrier and cooperate with each other through two gears that are arranged on different axial lines and mesh with each other; a pair of clutch adjusting mechanisms that are connected to ends of the output gear unit, respectively, and each have a frictional multiplate clutch that is engaged/disengaged to adjust output power; and a pair of axles connected to the clutch adjusting mechanisms, respectively, each of the axles being passed through an opening of the stationary carrier and connected to a wheel. The output gear unit includes a ring gear formed on an outer circumferential part of the output gear unit and hollow joints formed at the ends of the output gear unit. Each of the clutch adjusting mechanisms includes a clutch input unit and a clutch output unit with the frictional multiplate clutch arranged between the clutch input unit and the clutch output unit. The clutch input unit includes a joint shaft and a clutch housing, the joint shaft being formed at a first end of the clutch input unit and inserted into and connected to the hollow joint of the output gear unit so that the hollow joint and clutch input unit may rotate together, the joint shaft and clutch housing rotating together. The clutch housing includes a first vertical wall connected to the joint shaft and a circumferential wall having a first end connected to the first vertical wall, the circumferential wall enclosing the frictional multiplate clutch. The first vertical wall includes an output unit support that rotatably supports a first end of the clutch output unit at a position that is axially different from the position of the joint shaft. A second end of the clutch output unit includes a hollow axle joint into which the axle is inserted and connected so that the clutch output unit and axle may rotate together.

According to this aspect, the joint shaft of the clutch input unit is inserted into and connected to the hollow joint of the output gear unit. This configuration can secure a sufficient connection span for stably supporting the joint shaft with the hollow joint and steadily rotating the hollow joint and joint shaft together.

According to the aspect, the output unit support of the first vertical wall rotatably supports the first end of the clutch output unit. This configuration stabilizes the support of each clutch output unit as well as the connection/disconnection of each frictional multiplate clutch.

According to the aspect, the output unit support of the first vertical wall supports the first end of the clutch output unit at a position that is axially different from the position of the joint shaft. This configuration allows the hollow joint coupled with the joint shaft to have a small diameter. This allows the output gear unit and the bearing supporting the output gear unit to have small diameters, thereby reducing the overall size of the apparatus and improving the rigidity and durability of the apparatus.

According to the aspect, the joint shaft of the clutch input unit is connected to the output gear unit through the hollow joint and the axle is connected to the clutch output unit through the hollow axle joint. This configuration allows each clutch adjusting mechanism to be assembled through an axial inserting action. As a result, the apparatus as a whole is easy to assemble.

In this way, the power transfer/transmission apparatus according to the above-mentioned aspect of the present invention includes the clutch adjusting mechanisms that are stable and easy to assemble. The stability and assembling easiness of the clutch adjusting mechanisms are realized by the hollow joint of the output gear unit that receives the joint shaft of the clutch input unit, the output unit support of the clutch input unit that rotatably supports the first end of the clutch output unit, and the hollow axle joint of the clutch output unit that receives an axle and rotates together with the axle.

DETAILED DESCRIPTION OF EMBODIMENTS

First Embodiment

<Four-Wheel-Drive Vehicle>

Figure 1:
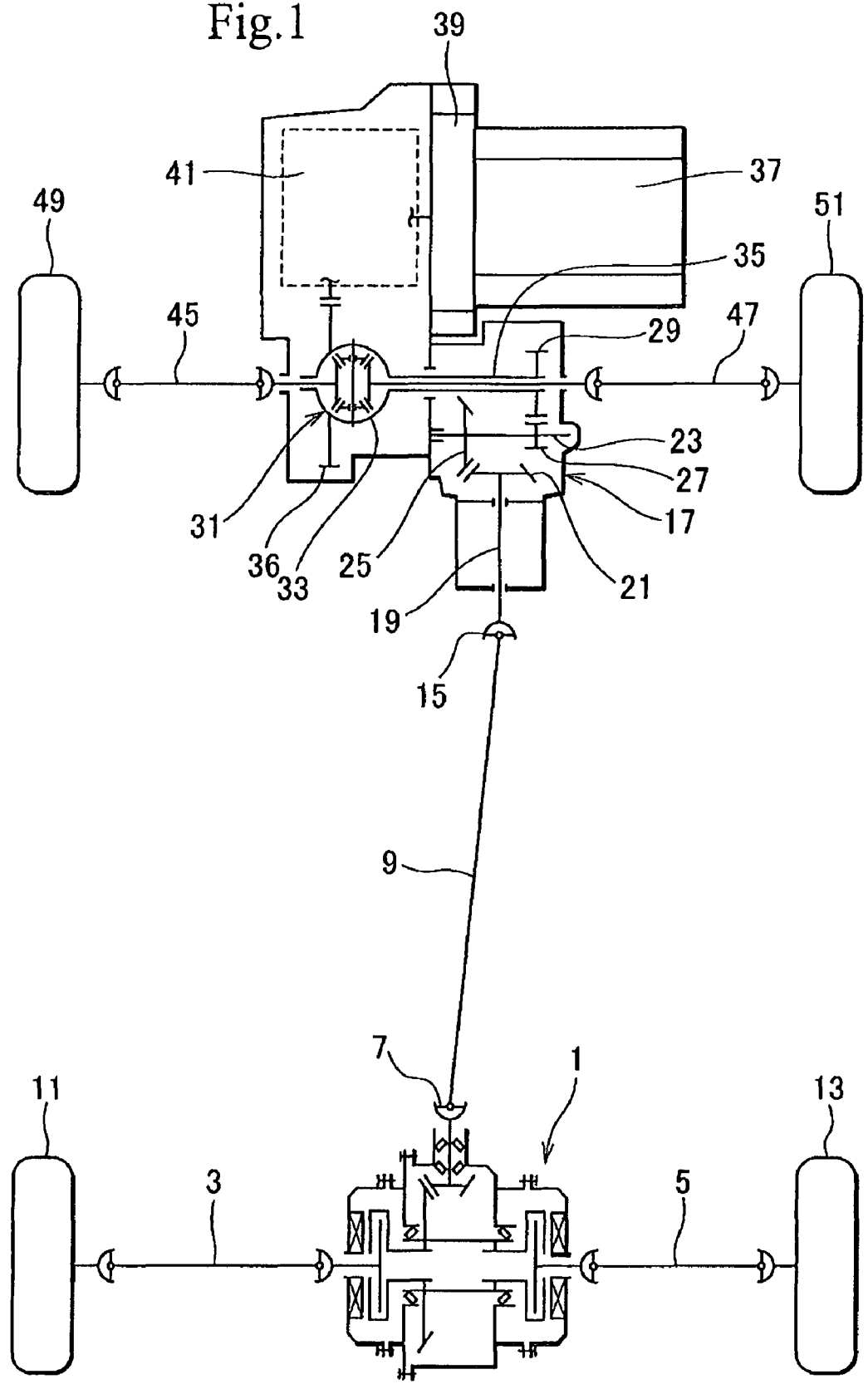
FIG. 1 is a schematic plan view showing a transverse-mounted-engine, front-drive-base, four-wheel-drive vehicle having a power transfer/transmission apparatus according to a first embodiment of the present invention.

FIG. 1 is a schematic plan view showing a transverse-mounted-engine, front-drive-base, four-wheel-drive vehicle that is provided with a power transfer/transmission apparatus 1 according to the first embodiment of the present invention.

In FIG. 1, the apparatus 1 according to the first embodiment is arranged between rear axles 3 and 5. An input side of the apparatus 1 is connected through a universal joint 7 to a propeller shaft 9. An output side of the apparatus 1 is connected to the rear axles 3 and 5.

The rear axles 3 and 5 are connected to left and right rear wheels 11 and 13, respectively. The propeller shaft 9 is connected through a universal joint 15 to an output shaft 19 of a transfer 17.

The output shaft 19 has an orthogonal gear 21 that meshes with an orthogonal gear 25 of a transmission shaft 23. The transmission shaft 23 has a helical gear 27 that meshes with a helical gear 29. The helical gear 29 is arranged on a hollow transmission shaft 35 that is connected to and rotated with a differential case 33 of a front differential 31.

The front differential 31 includes a ring gear 36 that receives power from an engine 37 through an electric motor 39 and a transmission 41. The front differential 31 is connected through front axles 45 and 47 to left and right front wheels 49 and 51.

Power of the engine 37 is transmitted through the motor 39 and transmission 41 to the ring gear 36 of the front differential 31. On the one hand, the power from the ring gear 36 is transmitted through the front axles 45 and 47 to the front wheels 49 and 51, and on the other hand, is transmitted through the differential case 33, hollow transmission shaft 35, helical gears 29 and 27, transmission shaft 23, and orthogonal gears 25 and 21 to the output shaft 19.

From the output shaft 19, the power is transmitted through the universal joint 15, propeller shaft 9, and universal joint 7 to the power transfer/transmission apparatus 1.

In a power adjusting/transmitting state, the apparatus 1 adjusts the power and transmits the adjusted power through the rear axles 3 and 5 to the rear wheels 11 and 13. Then, the vehicle runs in a four-wheel-drive mode with the front wheels 49 and 51 and rear wheels 11 and 13 being driven. If the apparatus 1 is not in the power adjusting/transmitting state, the vehicle runs in a two-wheel-drive mode with the front wheels 49 and 51 being driven.

The power transfer/transmission apparatus 1 of the first embodiment receives power of the engine 37 and motor 39 through the propeller shaft 9. Alternatively, a driving source such as an electric motor and a gear mechanism may separately be prepared to drive the apparatus 1 without using the engine 37, motor 39, and propeller shaft 9.

<Power Transfer/Transmission Apparatus>

Figure 2:
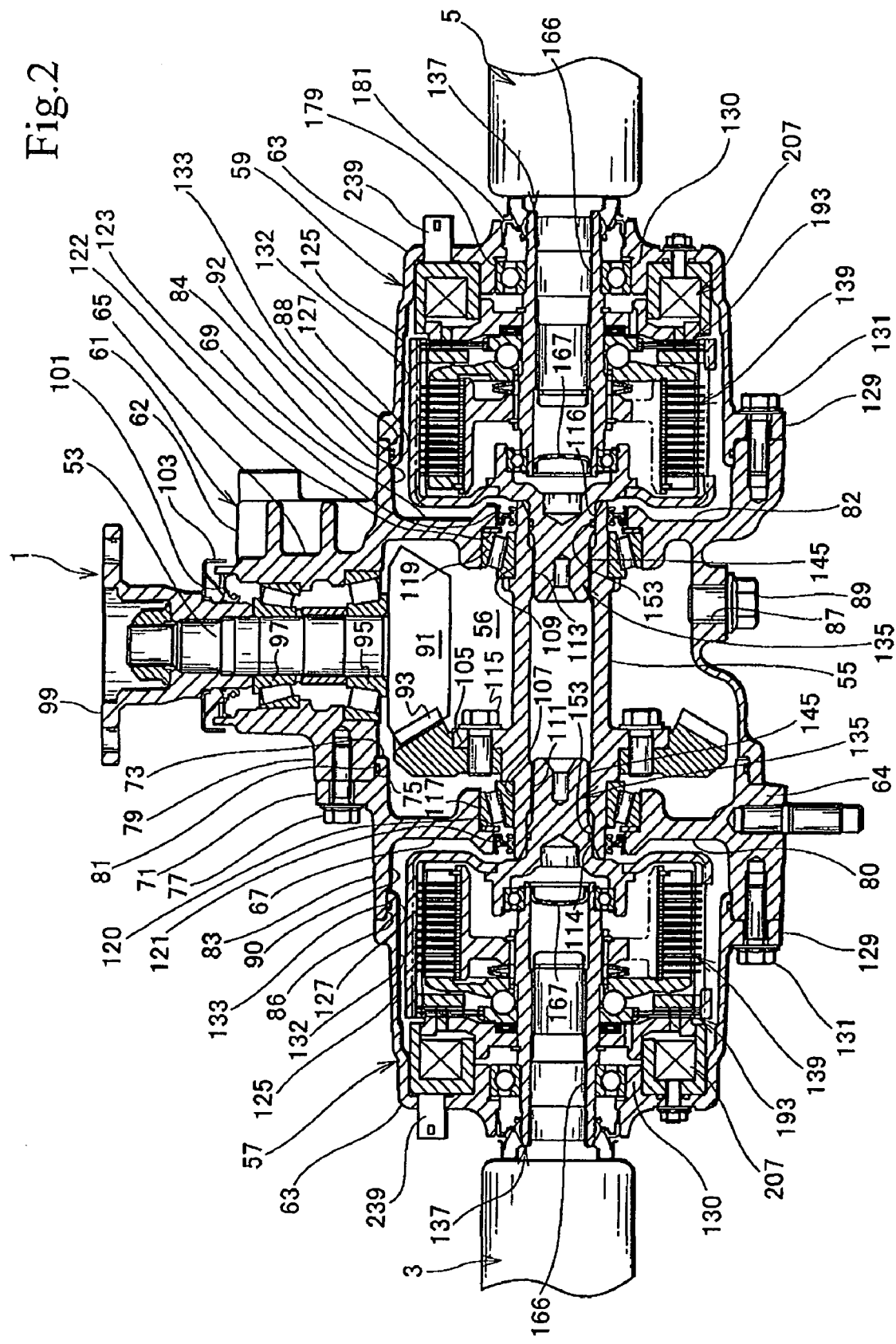
FIG. 2 is a sectional view showing the apparatus according to the first embodiment.

FIG. 2 is a sectional view showing the details of the power transfer/transmission apparatus 1 of the first embodiment.

In FIG. 2, the apparatus 1 includes an input gear unit 53, an output gear unit 55, and a pair of clutch adjusting mechanisms 57 and 59.

<Input and Output Gear Units>

The input gear unit 53 and output gear unit 55 are rotatably supported by a gear carrier 61. The clutch adjusting mechanisms 57 and 59 are supported by clutch carriers 63, respectively. The clutch carriers 63 are attached to the gear carrier 61. The gear carrier 61 and clutch carriers 63 form a stationary carrier.

The gear carrier 61 includes a gear carrier body 62 and a gear carrier cover 64. The gear carrier 61 rotatably supports the input and output gear units 53 and 55 and forms a gear chamber 56. The gear carrier 61 has a support cylinder 65 and support walls 67 and 69. The support walls 67 and 69 each have a stepped inner circumferential face. The support wall 67 forms the gear carrier cover 64 provided with a flange 71 and fitting part 73 and is removably attached to the gear carrier body 62.

The fitting part 73 is coupled with a fitting part 75 of the gear carrier 61 and the flange 71 is removably fixed to a joint part 79 of the gear carrier body 62 with bolts 77. Between the fitting parts 73 and 75, a seal 81 such as an O-ring is arranged.

On the axial left and right outer sides of the support walls 67 and 69, there are recesses 80 and 82 that are recessed toward the gear chamber 56. On the outer circumferential sides of the recesses 80 and 82, circumferential carrier joints 83 and 84 are integrated with and protrudes from the support walls 67 and 69, respectively. The carrier joints 83 and 84 have joint openings 86 and 88. The carrier joints 83 and 84 have tapered inner circumferential faces 90 and 92.

Between the support cylinder 65 and the support walls 67 and 69, the closed gear chamber 56 is defined to contain oil for lubricating and cooling hypoid gears and bearings. The gear chamber 56 has a drain hole 87 closed with a drain plug 89 and a filler hole (not shown) closed with a filler plug.

According to the first embodiment, the input gear unit 53 and output gear unit 55 are connected to each other to transmit power through a drive pinion gear 91 and a ring gear 93 that mesh with each other. The drive pinion gear 91 and ring gear 93 are hypoid gears arranged on different axial lines.

The two gears arranged on different axial lines may be bevel gears, parallel gears, worm gears, or the like. A helix angle of each gear may properly be determined according to requirements.

The input gear unit 53 includes a solid drive pinion shaft having the integrated drive pinion gear 91 and is rotatably supported by tapered roller bearings 95 and 97 on the support cylinder 65 of the gear carrier 61. The input gear unit 53 is attached to a flange 99 that is fitted to the universal joint 7. Between an outer circumferential face of the flange 99 and an end of an inner circumferential face of the support cylinder 65, a seal 101 is arranged. Outside the seal 101, the flange 99 is provided with a dust cover 103.

The output gear unit 55 has a hollow shaft. At an intermediate part of an outer circumference of the hollow shaft, a flange 105 is formed. Ends of the hollow shaft are provided with stepped centering parts 107 and 109 for supporting shafts. The output gear unit 55 includes hollow joints 114 and 116 that are formed on the inner circumferential sides of the centering parts 107 and 109 and are provided with inner splines 111 and 113.

To the flange 105 of the output gear unit 55, the ring gear 93 is fixed with bolts 115. The centering parts 107 and 109 are rotatably supported by tapered roller bearings 117 and 119 on the support walls 67 and 69 of the gear carrier 61.

The tapered roller bearings 117 and 119 are positioned without looseness with respect to the support walls 67 and 69 through shims 120 and 122.

On the axial outer side of the tapered roller bearing 117 (119), a seal 121 (123) is arranged between the support wall 67 (69) and an end of the output gear unit 55. The seal 121 (123) is positioned on the inner circumferential side of the recess 80 (82).

The gear chamber 56 is closed with the seals 81, 101, 121, and 123 within the gear carrier 61, to contain gear oil serving as lubricant. The gear oil is different from and more viscous than lubricant contained in the clutch adjusting mechanisms 57 and 59.

<Clutch Adjusting Mechanism>

The left and right clutch adjusting mechanisms 57 and 59 form a pair and are symmetrically formed. The clutch adjusting mechanisms 57 and 59 are coupled with ends of the output gear unit 55, and according to the engagement and disengagement of frictional multiplate clutches, adjust output power.

Figure 3:
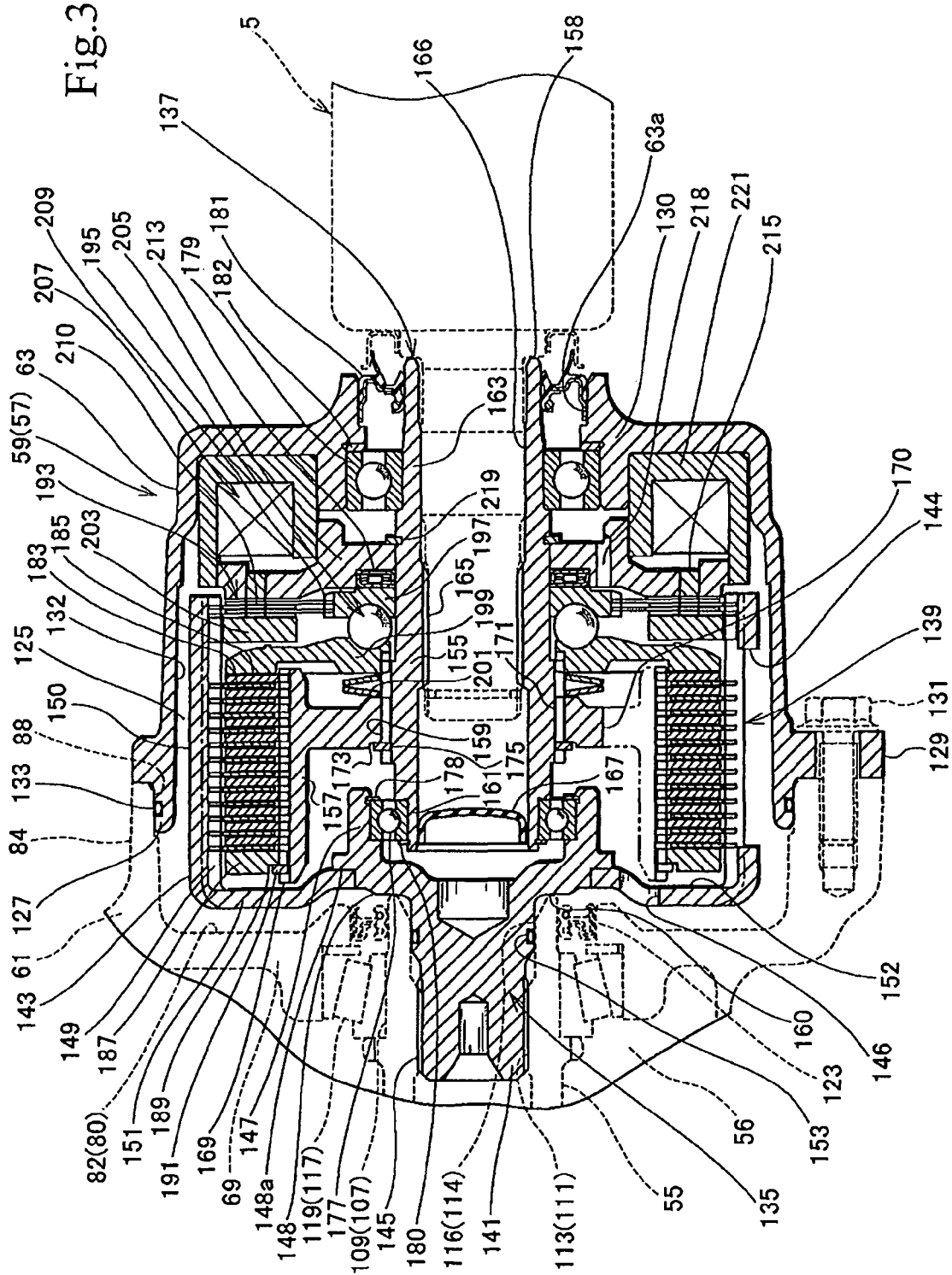
FIG. 3 is an enlarged sectional view showing a clutch adjusting mechanism of the apparatus according to the first embodiment.

FIG. 3 is an enlarged sectional view showing the clutch adjusting mechanism 59.

The details of the clutch adjusting mechanism 59 will be explained with reference to FIGS. 2 and 3. Since the clutch adjusting mechanisms 57 and 59 are symmetrical to each other, like parts thereof are represented with like reference marks to omit the explanation of the mechanism 57.

The clutch adjusting mechanism 59 is supported by the clutch carrier 63. The clutch carrier 63 is attached to the gear carrier 61 and defines a clutch chamber 125.

The clutch carrier 63 has a fitting part 127 and a flange 129 that are formed at an axial inner end (left end in FIG. 3) of the clutch carrier 63. An axial outer end (right end in FIG. 3) of the clutch carrier 63 is provided with a shaft support 130 that protrudes in a radial inner direction.

The clutch carrier 63 has an inner circumferential face 132 that is tapered toward the axial outer end of the clutch carrier 63, to guide splashed lubricant toward the axial outer end.

The clutch chamber 125 is closed with seals (to be explained later) arranged between two components that do not rotate relative to each other. The clutch chamber 125 contains clutch oil. The clutch oil is lubricant whose viscosity is lower than the gear oil contained in the gear chamber 56 and keeps liquidity at low temperatures in, for example, winter. The clutch chamber 125 may contain lubricant that is similar to the gear oil.

The fitting part 127 of the clutch carrier 63 is fitted to the joint opening 88 (86) of the gear carrier 61 and the flange 129 is removably fixed to the carrier joint 84 (83) of the gear carrier 61 with bolts 131. Between the fitting part 127 and the joint opening 88 (86), there is arranged a seal 133 such as an O-ring. Between the fitting part 127 and the joint opening 88 (86), there is no relative rotation. Namely, this is the above-mentioned structure involving two components that do not rotate relative to each other with a seal interposed between them.

The clutch adjusting mechanism 59 includes a clutch input unit 135 and a clutch output unit 137. Between the clutch input and output units 135 and 137, a main clutch 139 that is a frictional multiplate clutch is arranged.

The clutch input unit 135 has a joint shaft 141 and a clutch housing 143 that is fixed to an outer circumferential part of the joint shaft 141 by, for example, welding. The joint shaft 141 is axially removably connected to the output gear unit 55. The joint shaft 141 has a first end around which splines 145 are formed and a second end which is provided with an integaral flange 148. An outer circumferential part of the flange 148 has a joint step 148a. Adjacent to the joint step 148a, there is a circumferential output unit support 147. The output unit support 147 is formed at a position that is axially different from the position of the joint shaft 141.

The clutch housing 143 has a circumferential wall 150 on which inner splines 149 are formed. A first end of the clutch housing 143 has a vertical wall 151. The vertical wall 151 is fixed to the joint step 148a by welding, bonding, or the like. The flange 148 and vertical wall 151 form a first vertical wall of the clutch housing 143 connected to the joint shaft 141.

The vertical wall 151 has a recess 152. The recess 152 is defined by the vertical wall 152 protruding toward the support wall 69 (67) of the gear carrier 61. The recess 152 faces a clutch hub 157.

The vertical wall 151 is axially partly within the recess 82 (80) of the gear carrier 61. With this protruding shape of the vertical wall 151, the inner splines 149 on the circumferential wall 150 of the clutch housing 143 can sufficiently secure the length thereof within a limited space of the clutch housing 143.

The circumferential wall 150 surrounds the output unit support 147 of the joint shaft 141. The circumferential wall 150 has a slit-like through window 144 serving as a second communicating part. The window 144 may be formed by cutting some of the inner splines 149. The window 144 opens the outer side of the main clutch 139, to pass the clutch oil from the inside of the main clutch 139 toward the inner circumferential face 132 of the clutch carrier 63.

The vertical wall 151 of the clutch housing 143 is provided with an oil hole 146. The oil hole 146 is axially formed to serve as a third communicating part between the joint shaft 141 and the main clutch 139.

The joint shaft 141 of the clutch input unit 135 is joined with an end of the output gear unit 55, so that the splines 145 of the joint shaft 141 engage with the inner splines 113 (111) of the output gear unit 55.

The splines 113 (111) and 145 that connect the output gear unit 55 and clutch input unit 135 to each other are on the inner circumferential side of the tapered roller bearing 119 (117), to effectively use a radial space and reduce an axial size.

Between the output gear unit 55 and the joint shaft 141 of the clutch input unit 135, there is arranged a seal 153 such as an O-ring. Between the output gear unit 55 and the joint shaft 141, there is no relative rotation. This is also the above-mentioned structure involving two components that do not rotate relative to each other with a seal interposed between them.

The clutch output unit 137 includes a hollow shaft 155 and the clutch hub 157.

The hollow shaft 155 has splines 159 on the outer circumferential face thereof. Ends of the hollow shaft 155 have stepped centering parts 161 and 163. The centering part 163 is at a second end of the clutch output unit 137 and forms a hollow axle joint 166 that is provided with inner splines 165. From an outer end of the axle joint 166, the rear axle 5 (3) is inserted and is engaged with the inner splines 165. The rear axle 5 (3) passes through an opening 63a of the clutch carrier 63 and is connected to a wheel.

An inner end of the hollow shaft 155 is closed with a plug 167 as a closing member to maintain a closed state of the clutch chamber 125.

An outer circumferential face of the clutch hub 157 is provided with splines 169 and an inner circumferential face thereof is provided with inner splines 171. At one ends of the inner splines 171, there is formed a ring positioning recess 173. The clutch hub 157 has a slit-like through hole 170. The through hole 170 extends from a radially intermediate part of the clutch hub 157 to the outer circumference of the clutch hub 157 and serves as a first communicating part. The through hole 170 may be formed by cutting some of the splines 169. The through hole 170 opens the main clutch 139, to pass the clutch oil from the inside of the main clutch 139 toward the axis of rotation.

The inner splines 171 of the clutch hub 157 engage with the splines 159 of the hollow shaft 155. Movement of the clutch hub 157 in an axial inward direction is restricted by a snap ring 175 serving as a stopper fitted to the splines 159. The snap ring 175 engages with the ring positioning recess 173 of the clutch hub 157 with a slight gap being present on the outer circumferential side of the snap ring 175, to prevent the snap ring 175 from circumferentially expanding and dropping.

The outer circumferential side of the clutch hub 157 having the splines 169 is in the vicinity of the vertical wall 151 of the clutch housing 143 and an end of the clutch hub 157 enters into the recess 152 of the clutch housing 143.

Since the clutch hub 157 axially overlaps the vertical wall 151 of the clutch housing 143, the splines 169 can properly be extended to match with the inner splines 149.

As a result, the main clutch 139 arranged between the clutch housing 143 and the clutch hub 157 can have a sufficient number of clutch plates without enlarging the axial size thereof. This helps reduce the fitting angle of the rear axle 5 (3), minimize a driving loss at a joint of the rear axle, lower heat generation at the joint of the rear axle, and improve the durability of the joint of the rear axle.

At the first end of the hollow shaft 155, i.e., at the first end of the clutch output unit 137, the centering part 161 is rotatably supported with a ball bearing 177 on the output unit support 147 of the clutch input unit 135. The ball bearing 177 is firmly positioned with a shim 178 and a snap ring (or washer) 180 with respect to the output unit support 147 and centering part 161.

The supporting of the clutch input unit 135 and clutch output unit 137 with the ball bearing 177 is achieved on the inner circumferential side of the circumferential wall 150 of the clutch housing 143. This configuration effectively uses a diametral space in the clutch housing 143 and is effective to reduce the axial size of the clutch housing 143. This results in reducing the fitting angle of the rear axle 5 (3) connected to the clutch output unit 137, minimizing a driving loss at the joint of the rear axle, lowering heat generation at the joint of the rear axle, and improving the durability of the joint of the rear axle.

At the second end of the hollow shaft 155, i.e., at the second end of the clutch output unit 137, the centering part 163 is rotatably supported with a ball bearing 179 on the shaft support 130 of the clutch carrier 63. Between an outer race of the ball bearing 179 and the clutch carrier 63, there is interposed a shim 182 serving as a gap adjuster. The gap adjuster may be a washer or a member such as a disc spring. Alternatively, the gap adjuster may be omitted, so that the ball bearing 179 is in abutting contact with the clutch carrier 63 directly.

In this way, an outer circumferential part of the second end of the clutch output unit 137 is supported with the ball bearing 179 on the clutch carrier 63.

The first end of the clutch adjusting mechanism 59 (57) is positioned by a contact face 160 of the flange 148 that is axially in contact with the output gear unit 55 whose tip end extends to protrude from the seal 123 (121) and enter into the clutch chamber 125. At the same time, the second end of the clutch adjusting mechanism 59 (57) is positioned by the shim 182 that is adjacent to the clutch output unit 137 and is axially in contact with the clutch carrier 63.

On the axial outer side of the ball bearing 179, a seal 181 is interposed between the clutch carrier 63 and the hollow shaft 155 of the clutch output unit 137. Therefore, the hollow axle joint 166 is defined and closed by the plug 167 as a closing member in an inside of the clutch output unit 137, and the seal 181 is arranged between the clutch output unit 137 and the stationary carrier 63. In this way, the clutch output unit 137, plug 167 and seal 181 close the apparatus without attaching the rear axles 3 and 5 or joint shafts thereof.

The main clutch 139 has a plurality of outer plates 183 and a plurality of inner plates 185. The outer plates 183 each are made of a thin plate provided with paper material or a carbon sheet, or a carbon-coated thin plate. The inner plates 185 each are made of a steel thick plate without paper material or the like.

At an end of the main clutch 139, a pressure receiving plate 187 is arranged. The pressure receiving plate 187 has a ring positioning recess 189 and is coupled with the clutch hub 157 through splines.

Axial movement of the pressure receiving plate 187 is restricted by a snap ring 191 attached to the clutch hub 157. The snap ring 191 is received in the ring positioning recess 189 with a slight circumferential gap between them. This configuration prevents the snap ring 191 from circumferentially expanding and dropping.

Adjacent to the pressure receiving plate 187, the outer plates 183 of the main clutch 139 are arranged.

The clutch adjusting mechanism 59 includes, in addition to the main clutch 139, a pilot clutch 193, a ball cam 195, a cam ring 197, a pressure plate 199, a return spring 201, an armature 203, a rotor 205, and an electromagnet 207 for driving the pilot clutch 193.

The pilot clutch 193 is arranged between the clutch housing 143 and the cam ring 197. Outer plates of the pilot clutch 193 engage with the inner splines 149 of the clutch housing 143 and inner plates of the pilot clutch 193 engage with splines 209 of the cam ring 197. The outer and inner plates of the pilot clutch 193 are provided with a hole 210 serving as a nonmagnetic part.

The cam ring 197 is rotatably supported on the outer circumference of the hollow shaft 155. The ball cam 195 serving as a cam mechanism is arranged between the pressure plate 199 and the cam ring 197. The cam ring 197 and pressure plate 199 axially face each other with the ball cam 195 interposed between them.

The pressure plate 199 is arranged adjacent to the main clutch 139 and is engaged with the splines 159 of the hollow shaft 155 to rotate with the hollow shaft 155 and be movable axially. Receiving thrust from the ball cam 195, the pressure plate 199 moves to push the main clutch 139.

Adjacent to the pressure plate 199, there is the inner plate 185 of the main clutch 139, the inner plate 185 being a thick plate without paper material or the like. Since the pressure plate 199 does not slide on the inner plate 185, the inner plate can omit paper material or the like.

The return spring 201 is a disk spring interposed between the clutch hub 157 and the pressure plate 199, to push the pressure plate 199 in a direction to release the main clutch 139.

Between the cam ring 197 and the rotor 205, a thrust bearing 213 is arranged. The thrust bearing 213 receives reaction force from the ball cam 195 and absorbs relative rotation between the cam ring 197 and the rotor 205.

The rotor 205 has a nonmagnetic part 215 and is rotatably supported around the hollow shaft 155. The rotor 205 is provided with a rotor oil hole 218 that is on the radially inner side of the electromagnet 207, axially passes through the rotor 205, and serves as a fourth communicating part. Axial movement of the rotor 205 is restricted by a snap ring 219 serving as a stopper fitted to the hollow shaft 155.

The armature 203 has a ring shape, is arranged between the pressure plate 199 and the pilot clutch 193, and faces the rotor 205 with the pilot clutch 193 interposed between them. The armature 203 engages with the inner splines 149 of the clutch housing 143 and is axially movable.

The electromagnet 207 is fixed to the clutch carrier 63. Between a core 221 of the electromagnet 207 and the rotor 205, there is formed a proper air gap. The air gap, rotor 205, pilot clutch 193, and armature 203 form a magnetic path of the electromagnet 207. When energized, the electromagnet 207 forms a magnetic flux loop extending along the nonmagnetic part 215, the periphery of the nonmagnetic hole 210, and the armature 203.

<Lubrication Spaces of Three Chambers>

As mentioned above, the drive pinion gear 91 and ring gear 93 are contained in the sealed gear chamber 56. An essential part of the clutch adjusting mechanism 59 (57) including the main clutch 139 is contained in the sealed clutch chamber 125. Each of the three independent chambers, i.e., the gear chamber 56 and the left and right clutch chambers 125 forms a lubrication space in which lubricant is sealed.

The three independent chambers involve a plurality of seals including the seal 133 between the gear carrier 61 and the clutch carrier 63, the seal 123 between the gear carrier 61 and the output gear unit 55, the seal 153 between the output gear unit 55 and the clutch input unit 135, and the seal 181 between the clutch carrier 63 and the clutch output unit 137. These seals secure the independent closed three chambers.

<Other Structural Parts>

Figure 4:
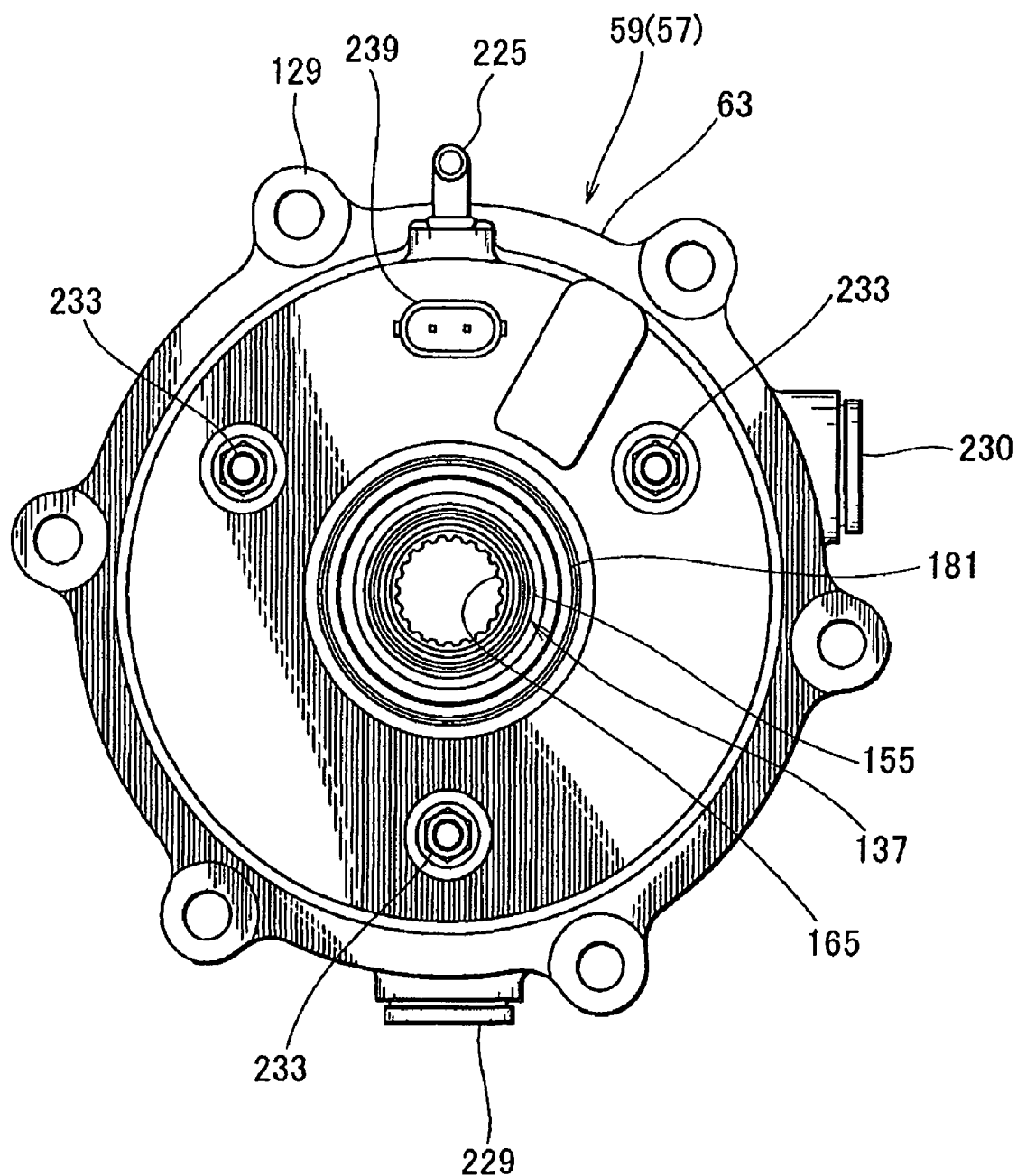
FIG. 4 is a side view showing the clutch adjusting mechanism of the apparatus according to the first embodiment.
Figure 5:
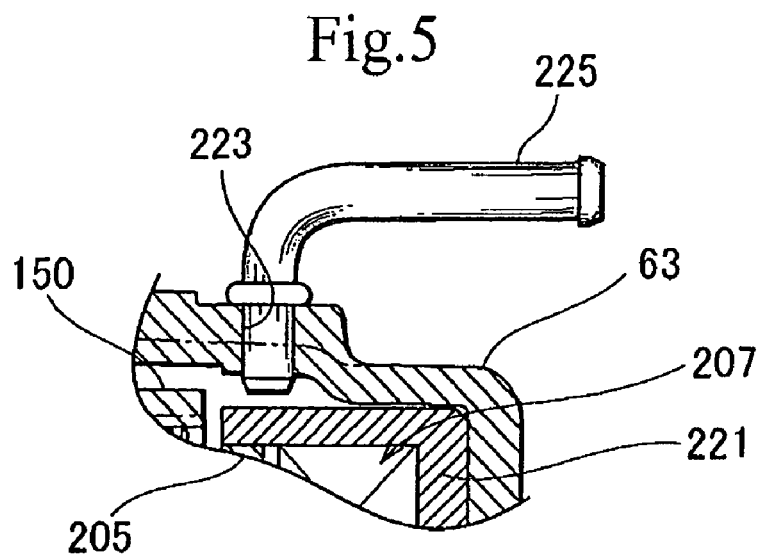
FIG. 5 is an enlarged sectional view showing a breather installing part of the apparatus according to the first embodiment.
Figure 6:
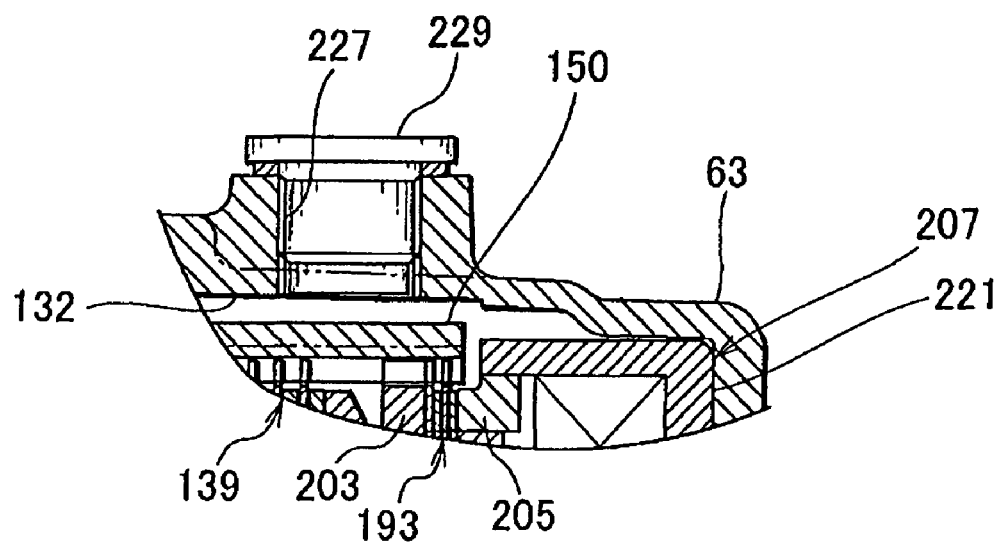
FIG. 6 is an enlarged sectional view showing a drain plug installing part of the apparatus according to the first embodiment.
Figure 7:
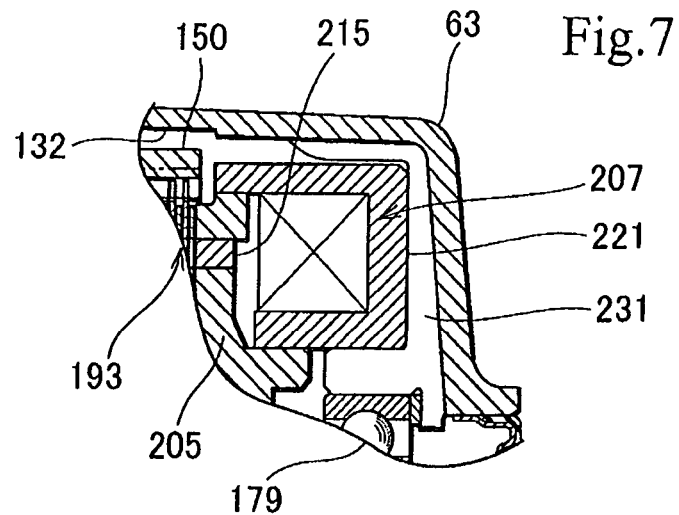
FIG. 7 is an enlarged sectional view showing an oil path of the apparatus according to the first embodiment.
Figure 8:
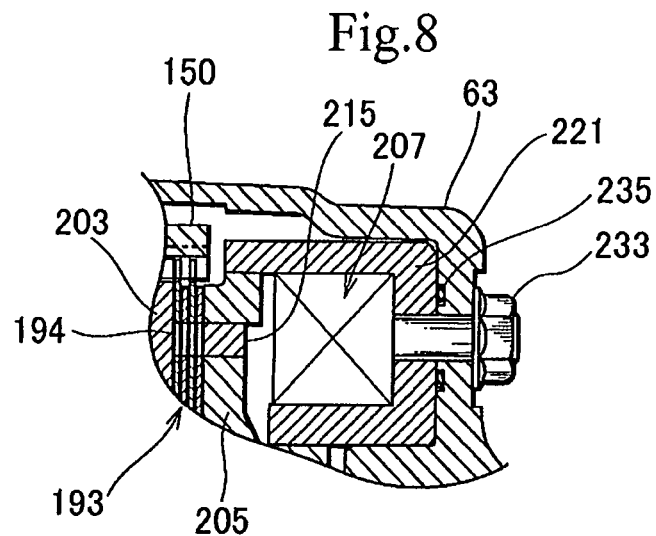
FIG. 8 is an enlarged sectional view showing a magnet stopper of the apparatus according to the first embodiment.
Figure 9:
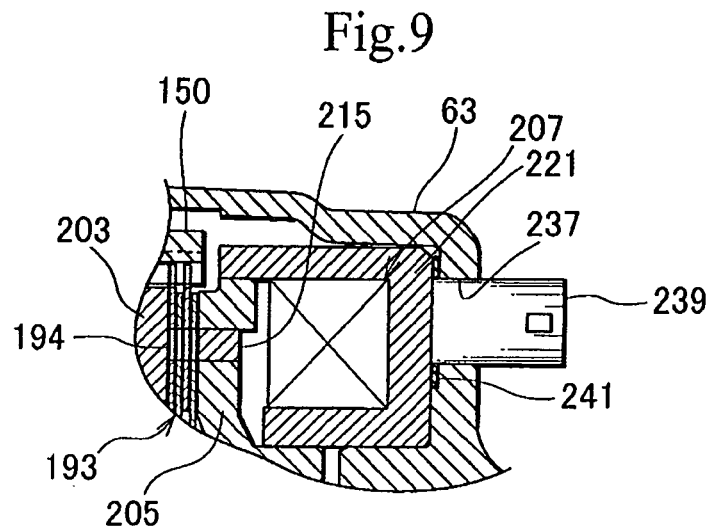
FIG. 9 is an enlarged sectional view showing a connector installing part of the apparatus according to the first embodiment.

FIG. 4 is a side view showing the clutch adjusting mechanism 59 (57), FIG. 5 is an enlarged sectional view showing a breather installing part, FIG. 6 is an enlarged sectional view showing a drain plug installing part, FIG. 7 is an enlarged sectional view showing an oil path, FIG. 8 is an enlarged sectional view showing a magnet stopper, and FIG. 9 is an enlarged sectional view showing a connector installing part.

In FIG. 4, a filler plug 230 is arranged at a part of the periphery of the clutch carrier 63. The filler plug 230 is fitted to a hole whose perpendicular lower end defines a level (quantity) of clutch oil sealed in the clutch adjusting mechanism 59 (57).

In FIGS. 3, 4, and 5, the clutch carrier 63 has a breather hole 223 for discharging air. The breather hole 223 is connected to a breather pipe 225.

In FIGS. 3, 4, and 6, the clutch carrier 63 has a drain hole 227 for draining clutch oil. The drain hole 227 is closed with a drain plug 229.

In FIGS. 3 and 7, a vertical oil path 231 as a fifth communicating part is formed between the clutch carrier 63 and the electromagnet 207. The oil path 231 extends along the inner circumferential face 132 of the clutch carrier 63 and the back of the electromagnet 207 and connects with the clutch chamber 125 on the radially inner side of the electromagnet 207. It is possible to arrange a plurality of oil paths 231. The clutch oil is axially outwardly guided along the inner circumferential face 132 of the clutch carrier 63 and is passed through the oil path 231 around the electromagnet 207 and to the axial left and right sides of the ball bearing 179.

In FIGS. 3, 4, and 8, the electromagnet 207 is fixed to the side face of the clutch carrier 63 at three locations with bolts 233. Between the back of the core 221 of the electromagnet 207 and the inner side of the side face of the clutch carrier 63, there is arranged a seal 235 such as an O-ring.

In FIGS. 3, 4, and 9, the clutch carrier 63 has a connector hole 237 to pass a connector 239 of the electromagnet 207 to the outside of the clutch carrier 63, so that the connector 239 is connected to an external part. Between the back of the core 221 of the electromagnet 207 and the inner side of the side face of the clutch carrier 63, there is arranged a seal 241 such as an O-ring.

<Sub-Assembly of Clutch Adjusting Mechanism>

Returning FIG. 2, the gear carrier 61 has the seal 123 between the support wall 69 (67) and the output gear unit 55, so that the gear chamber 56 may separately seal gear oil.

Each of the clutch adjusting mechanisms 57 and 59 has the above-mentioned configuration, and therefore, can be made as a sub-assembly as shown in FIG. 3.

Namely, the clutch carrier 63 has the fitting part 127 and flange 129 that are at the axial inner end of the clutch carrier 63 and are fitted to the gear carrier 61. At the axial outer end, the clutch carrier 63 has the shaft support 130 that radially inwardly protrudes.

The clutch input unit 135 has the joint shaft 141 that is axially removably connected to the output gear unit 55 through splines.

The output unit support 147 of the clutch input unit 135 is rotatably supported with the ball bearing 177 at the first end of the hollow shaft 155 of the clutch output unit 137. The second end of the hollow shaft 155 is rotatably supported with the ball bearing 179 on the shaft support 130 of the clutch carrier 63.

The electromagnet 207 is fixed to the clutch carrier 63 in the vicinity of the rotor 205.

The rotor 205 and clutch hub 157 are positioned with the snap rings 219 and 175 on the outer circumference of the hollow shaft 155.

Each of the clutch adjusting mechanisms 57 and 59 is prepared as a sub-assembly and is installed by inserting the joint shaft 141 of the clutch input unit 135 into the hollow joint 116 (114) of the output gear unit 55 so that the splines 145 may engage with the inner splines 113 (111).

At the same time, the fitting part 127 of the clutch carrier 63 is fitted to the joint opening 88 (86) of the gear carrier 61 with the seal 133 interposed between them.

Thereafter, the flange 129 is fixed to the carrier joint 84 (83) of the gear carrier 61 with the bolts 131, thereby completing the installation of the sub-assembly, i.e., the clutch adjusting mechanism 59 (57).

With respect to the clutch adjusting mechanism 59 (57), the rear axle 5 (3) is inserted into the hollow axle joint 166 of the hollow shaft 155, so that the splines of the rear axle may engage with the inner splines 165 of the hollow shaft 155.

The inner splines 165 engaged with the rear axle 5 (3) are lubricated with grease. To prevent the part lubricated with the grease from being affected by water, dust, and the like, it is preferable to arrange, for example, an O-ring between the hollow shaft 155 and the rear axle 5 (3) on the axial outer side of the inner splines 165.

<Engagement/Disengagement Control of Main Clutch>

The engagement/disengagement control of the main clutch 139 is carried out through the energization control of the electromagnet 207.

Various sensors are mounted on the vehicle to detect road conditions and driving/steering conditions including starting, accelerating, and turning conditions. According to the detected conditions, a controller centrally controls the left and right electromagnets 207 to control the output torque of the left and right clutch adjusting mechanisms 57 and 59.

When energized, the electromagnet 207 forms the above-mentioned magnetic flux loop, to attract the armature 203 and engage the pilot clutch 193 between the armature 203 and the rotor 205. The pilot clutch 193 then generates pilot torque. Through the pilot clutch 193, the cam ring 197 is connected to the clutch housing 143 and tries to turn together with the clutch housing 143.

At this time, the pressure plate 199 is connected through the hollow shaft 155 to the rear axle 5 (3), and therefore, a relative rotation occurs between the cam ring 197 and the pressure plate 199. As a result, the ball cam 195 generates thrust to axially separate the cam ring 197 and pressure plate 199 from each other.

The thrust is applied through the thrust bearing 213 and rotor 205 to the snap ring 219, and on the other hand, is applied through the pressure plate 199, main clutch 139, snap ring 191, and clutch hub 157 to the snap ring 175.

The thrust to the snap rings 219 and 175 is applied to the hollow shaft 155, to adjustably engage the main clutch 139 between the pressure plate 199 and the pressure receiving plate 187. In this way, the cam thrust is surely received by the hollow shaft 155.

When the electromagnet 207 is de-energized, the ball cam 195 loses the thrust. The return spring 201 between the clutch hub 157 and the pressure plate 199 moves the pressure plate 199 away from the main clutch 139. Depending on the distance between the pressure plate 199 and the main clutch 139, the engagement of the main clutch 139 is released.

<Power Transmission>

When the electromagnet 207 is energized to adjustably engage the clutch adjusting mechanism 59 (57), power transmitted from the propeller shaft 9 to the input gear unit 53 is transmitted through the drive pinion gear 91, ring gear 93, and output gear unit 55 to the clutch input unit 135 of the clutch adjusting mechanism 59 (57).

The power to the clutch input unit 135 is transmitted to the clutch housing 143, main clutch 139, and clutch hub 157. Thereafter, the power is output from the clutch output unit 137.

The power output from the clutch output unit 137 of the clutch adjusting mechanism 59 (57) is transmitted through the rear axle 5 (3) to the rear wheel 13 (11).

As a result, the vehicle runs in a four-wheel driving state with the front and rear wheels 49, 51, 11, and 13 being driven. At this time, the engagement of the main clutch 139 is adjusted according to the running and steering conditions of the vehicle, to optionally control the differential rotation of the left and right rear wheels 11 and 13, the differential locking of the rear wheels 11 and 13, and the different torque transmission to each of the rear wheels 11 and 13. These control operations improve the steering, running, and bad-road driving abilities of the vehicle involving, for example, the yaw of the vehicle.

When the clutch adjusting mechanisms 57 and 59 are not in a power output state, the vehicle runs in a two-wheel driving state with the front wheels 49 and 51 being driven.

When power is transmitted through the clutch adjusting mechanisms 57 and 59 to the rear wheels 11 and 13, upthrust force may axially be applied from the axle 5 (3) to the hollow shaft 155 of the clutch adjusting mechanism 59 (57). From the hollow shaft 155, the upthrust force is transmitted through the centering part 161, ball bearing 177, and output unit support 147 to the clutch input unit 135. From the clutch input unit 135, the upthrust force is applied to the output gear unit 55. From the output gear unit 55, the upthrust force is transmitted through the tapered roller bearings 119 (117) to the support wall 69 (67) of the gear carrier 61. Namely, the upthrust force is surely received by the strong gear carrier 61.

<Lubrication>

Lubricant is filled up to the level of the axis of rotation in each of the gear chamber 56 and left and right clutch chambers 125.

In the gear chamber 56, the ring gear 93 splashes the gear oil upward when the ring gear 93 is turned, to lubricate the meshing drive pinion gear 91 and ring gear 93 and the tapered roller bearings 95 and 97.

In each of the left and right clutch chambers 125, the clutch input and output units 135 and 137 splash upward the clutch oil when the units are turned.

The splashed clutch oil passes through the through hole 170 of the clutch hub 157 to lubricate the main clutch 139 and the like. The clutch oil then passes through the window 144 of the clutch housing 143 and moves along the inner circumferential face 92 (90) of the carrier joint 84 (83) and the inner circumferential face 132 of the clutch carrier 63.

The clutch oil on the inner circumferential faces 92 (90) and 132 moves due to the inclination of the inner circumferential face 132 in an axial outward direction (rightward in FIG. 3), and due to the inclination of the inner circumferential face 92 (90) in an axial inward direction (leftward in FIG. 3).

The clutch oil moving along the inner circumferential face 132 passes through the oil path 231 (FIG. 7) around the electromagnet 207 to the axial left and right sides of the ball bearing 179. The clutch oil moving along the back of the rotor 205 passes through the oil hole 218 of the rotor 205 to the cam ring 197.

Such movements of the clutch oil sufficiently lubricate the ball bearing 179, seal 181, rotor 205, hollow shaft 155 (including a portion between the rotor 205 and the hollow shaft 155), thrust bearing 213, pilot clutch 193, ball cam 195, and the like.

The clutch oil on the inner circumferential face 92 (90) moves between the support wall 69 (67) of the gear carrier 61 and the clutch housing 143, passes through the oil hole 146, and returns to the inside of the clutch housing 143.

To guide the clutch oil, the inner circumferential faces 90, 92, 132, and the like may have guide paths. It is preferable to arrange such guide paths at locations where the clutch oil collects due to rotational force and gravity acting on the clutch oil.

The clutch oil that moves as mentioned above cools heat generated by the sliding of the main clutch 139 and pilot clutch 193.

Even if the vehicle slants leftward or rightward when it turns a curve or runs on a slanted road or even if the vehicle receives a large leftward or rightward G-force, the lubricant never moves among the left and right clutch chambers 125 and central gear chamber 56 because these chambers are sealed to be independent of one another. Namely, the lubricant never collects into one chamber. Each of the chambers 125 and 56 can keep the lubricant in its own space.

The driving source of the pilot clutch 193 is not limited to the electromagnet 207. The pilot clutch 193 may be driven by a hydraulic cylinder-piston, an electric motor, or the like. The driving source of the pilot clutch 193 is fixed to the clutch carrier 63, to surely conduct the engagement/disengagement of the pilot clutch 193.

Effect of First Embodiment

The power transfer/transmission apparatus 1 according to the first embodiment includes the input gear unit 53 and output gear unit 55 that are rotatably supported with the tapered roller bearings 95, 97, 117, and 119 on the stationary gear carrier 61. The input gear and output gear units 53 and 55 cooperate with each other through the drive pinion gear 91 and ring gear 93 that are arranged on different axial lines and mesh with each other. The power transfer/transmission apparatus 1 includes a pair of the clutch adjusting mechanisms 57 and 59 that are connected to ends of the output gear unit 55, respectively. Each clutch adjusting mechanisms 57 and 59 has the main clutch 139 that is engaged/disengaged to adjust output power. The power transfer/transmission apparatus 1 includes a pair of the rear axles 3 and 5 connected to the clutch adjusting mechanisms 57 and 59, respectively. Each of the axles is passed through the opening 63a of the clutch carrier 63 and connected to a rear wheel.

The output gear unit 55 includes the ring gear 93 formed on an outer circumferential part of the output gear unit 55 and the hollow joints 114 and 116 each formed on the inner circumferential face of the centering part 107 (109) having the inner splines 111 (113). Each of the clutch adjusting mechanisms 57 and 59 includes the clutch input unit 135 and clutch output unit 137 with the main clutch 139 being interposed between the clutch input unit and the clutch output unit. The clutch input unit 135 includes the joint shaft 141 and clutch housing 143, the joint shaft 141 being formed at the first end of the clutch input unit 135 and inserted into and connected to the hollow joint 114 (116) of the output gear unit 55 so that the hollow joint 114 (116) and clutch input unit 135 may rotate together, the joint shaft 141 and clutch housing 143 rotating together. The clutch housing 143 includes the first vertical wall (including the flange 148 and vertical wall 151) connected to the joint shaft 141 and the circumferential wall 150 connected to the first vertical wall and enclosing the main clutch 139. The flange 148 of the first vertical wall has the output unit support 147 that rotatably supports the first end of the clutch output unit 137 at a position that is axially different from the position of the joint shaft 141. The second end of the clutch output unit 137 includes the centering part 163 that forms the hollow axle joint 166 having the inner splines 165 engaged with the axle 3 (5) so that the axle joint 166 and axle 3 (5) may rotate together.

The joint shaft 141 of the clutch input unit 135 is inserted into the hollow output gear unit 55 so that the clutch input unit 135 and output gear unit 55 may rotate together. This configuration easily secures a connection span necessary for stably supporting the joint shaft 141.

The output unit support 147 of the flange 148 of the first vertical wall rotatably supports the first end of the clutch output unit 137. This configuration improves the stability of support of the clutch output unit 137, to secure the stable engagement/disengagement of the main clutch 139.

The first end of the clutch output unit 137 is rotatably supported with the output unit support 147 of the clutch input unit 135 at a location that is axially different from the position of the joint shaft 141. This configuration helps reduce the diameter of the hollow output gear unit 55 into which the joint shaft 141 is inserted. This results in reducing the diameter of the tapered roller bearings 117 and 119 that support the output gear unit 55 on the gear carrier 61. Consequently, the power transfer/transmission apparatus becomes compact with improved rigidity and durability.

The joint shaft 141 is coupled with the hollow joint 114 (116) of the output gear unit 55. The rear axle 3 (5) is coupled with the hollow axle joint 166 of the clutch output unit 137. This configuration allows the clutch adjusting mechanism 57 (59) to be assembled by axial insertion, thereby improving the assembling work of the power transfer/transmission apparatus.

The second end of the clutch output unit 137 is supported with the ball bearing 179 on the clutch carrier 63. The output unit support 147 of the clutch input unit 135 supports the outer circumference of the first end of the clutch output unit 137.

This configuration improves the stability of support of the clutch output unit 137 and rear axle 3 (5).

The stationary carrier includes the gear carrier 61 for supporting the input and output gear units 53 and 55 and the clutch carriers 63 for accommodating the clutch adjusting mechanisms 57 and 59. The first end of the clutch adjusting mechanism 57 (59) is positioned by the flange 148 of the first vertical wall that is axially in contact with the output gear unit 55. The second end of the clutch adjusting mechanism 57 (59) is positioned by the clutch output unit 137 that is axially in contact with the clutch carrier 63 through the ball bearing 179 and shim 182.

This configuration allows the clutch adjusting mechanisms 57 and 59 to be surely and properly positioned at the axial ends thereof, so that the gear carrier 61 and clutch carriers 63 may surely receive axial vibrations due to the meshing drive pinion gear 91 and ring gear 93 and axial thrust from the rear axles 3 and 5, to thereby suppress the influence of such axial vibrations and axial thrust on the engagement/disengagement of the main clutches 139.

Second Embodiment

Figure 10:
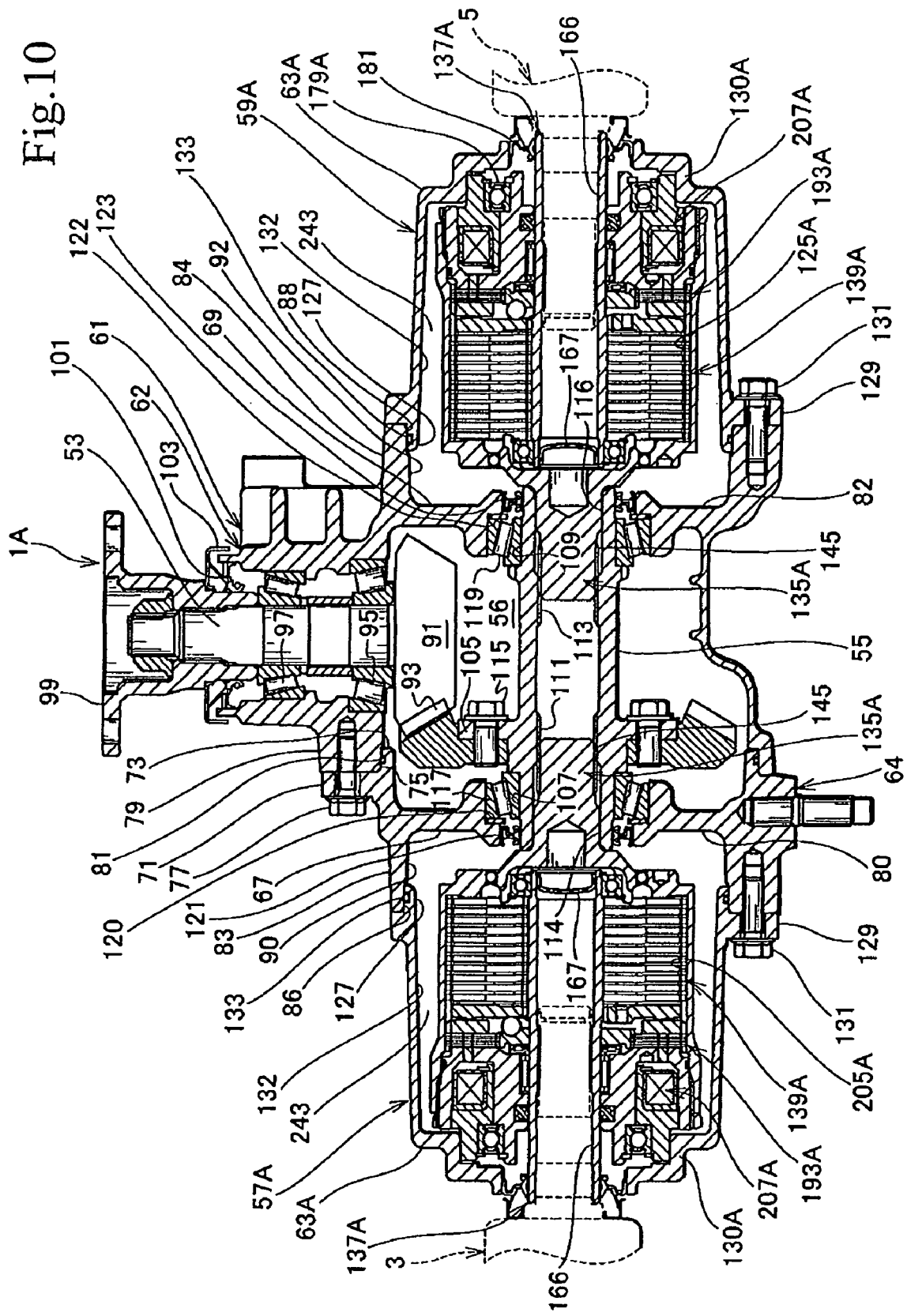
FIG. 10 is a sectional view showing a power transfer/transmission apparatus according to a second embodiment of the present invention.
Figure 11:
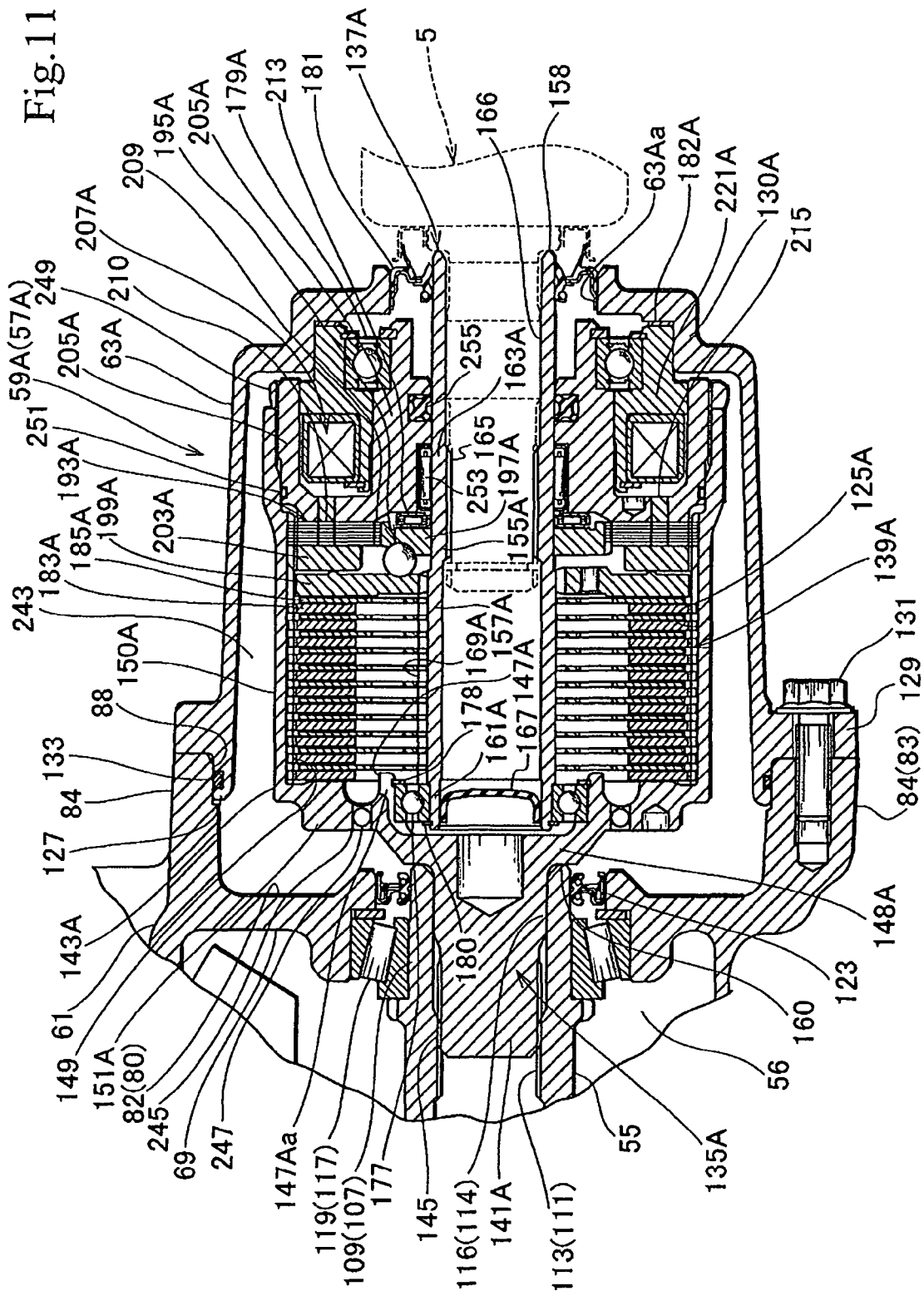
FIG. 11 is an enlarged sectional view showing a clutch adjusting mechanism of the apparatus according to the second embodiment.

FIG. 10 is a sectional view showing a power transfer/transmission apparatus according to the second embodiment of the present invention and FIG. 11 is an enlarged sectional view showing a clutch adjusting mechanism of the apparatus according to the second embodiment. The second embodiment is configured similar to the first embodiment, and therefore, employs the same reference marks as those of the first embodiment or the same reference marks plus "A" for the same or corresponding parts, to avoid repetitive explanation.

According to the power transfer/transmission apparatus 1A of the second embodiment, an output gear unit 55 has hollow joints 114 and 116 that have centering parts 107 and 109 and inner splines 111 and 113 formed on inner circumferential faces of the centering parts 107 and 109.

The apparatus 1A of the second embodiment also has a pair of clutch adjusting mechanisms 57A and 59A each being formed as a sealed coupling. Namely, in each of the clutch adjusting mechanisms 57A and 59A, a clutch chamber 125A is sealed between a clutch input unit 135A and a clutch output unit 137A.

<Clutch Adjusting Mechanism>

The left and right clutch adjusting mechanisms 57A and 59A form a pair and are symmetrically configured. The clutch adjusting mechanisms 57A and 59A are connected to ends of the output gear unit 55, respectively, and each include a main clutch 139A that is engaged and disengaged to adjust output power.

The details of the clutch adjusting mechanism 59A will be explained with reference to FIGS. 10 and 11. Since the clutch adjusting mechanisms 57A and 59A are symmetrical to each other, like parts thereof are represented with like reference marks to omit the explanation of the mechanism 57A.

The clutch adjusting mechanism 59A is contained in a clutch carrier 63A that is attached to a gear carrier 61. Around the clutch chamber 125A, there is a closed surrounding space 243 that is defined among the gear carrier 61, output gear unit 55, clutch carrier 63A, and clutch output unit 137A.

The space 243 contains coolant for cooling the clutch chamber 125A. The coolant may be liquid coolant, oil, or gaseous coolant such as air.

The clutch chamber 125A contains clutch oil. The clutch oil is lubricant whose viscosity is lower than gear oil contained in a gear chamber 56 and keeps liquidity at low temperatures in, for example, winter. The clutch chamber 125A may contain lubricant that is similar to the gear oil.

The clutch adjusting mechanism 59A includes a main clutch 139A that is a frictional multiplate clutch arranged between the clutch input and output units 135A and 137A.

According to the second embodiment, the clutch input unit 135A has a joint shaft 141A and a clutch housing 143A that is integral with an outer circumferential part of the joint shaft 141A. The clutch housing 143A includes a flange 148A and a vertical wall 151A that are integral with each other to form a first vertical wall.

On an inner circumferential face of an output unit support 147A of the clutch input unit 135A, an oil recess 147Aa axially extends in the vicinity of an outer circumference of a ball bearing 161A. The vertical wall 151A has an oil filling hole 245 that is closed with a steel ball 247. The hole 245 is used to pour lubricant into the clutch chamber 125A.

The clutch housing 143A has a second vertical wall served by a rotor 205A that is screwed to the clutch housing 143A. A nut 249 is fastened to prevent the unfastening of the rotor 205A. Between the clutch housing 143A and the rotor 205A, a seal 251 is arranged to seal the clutch chamber 125A. The clutch housing 143A and rotor 205A may be fixed together by welding, bonding, or the like.

At a first end of the clutch input unit 135A, the joint shaft 141A is supported by the output gear unit 55 and a tapered roller bearing 119 on a support wall 69 of the gear carrier 61. At a second end of the clutch input unit 135A, the rotor 205A is supported by a ball bearing 179A and a core 221A of an electromagnet 207A on a shaft support 130A of the clutch carrier 63A. Between the back of the electromagnet 207A and the clutch carrier 63A, there is a shim 182A serving as a gap adjuster.

The clutch output unit 137A includes a hollow shaft 155A and a clutch hub 157A that are integral with each other. The clutch output unit 137A has centering parts 161A and 163A.

The clutch output unit 137A is hollow and the hollow shaft 155A thereof has an axle joint 166 that is provided with inner splines 165 to be connected to an axle. From an outer end of the axle joint 166, a rear axle 5 (3) is inserted and is connected to the inner splines 165. The rear axle 5 (3) extends through an opening 63Aa of the clutch carrier 63A and is connected to a rear wheel.

An outer circumferential face of the clutch hub 157A of the clutch output unit 137A is provided with splines 169A. An inner end of the hollow shaft 155A in the vicinity of the clutch hub 157A is closed with a plug 167 to close the clutch chamber 125A. Instead of the plug 167, the inner circumference of the clutch hub 157A may have an integral partition wall to close the clutch chamber 125A.

At a first end (inner end) of the clutch output unit 137A, the centering part 161A is rotatably supported with a ball bearing 177 on the output unit support 147A of the clutch input unit 135A. The ball bearing 177 is firmly positioned with a shim 178 and a snap ring (or washer) 180 with respect to the output unit support 147A and centering part 161A.

At a second end (outer end) of the clutch output unit 137A, the centering part 163A is rotatably supported with a needle bearing 253 on the inner circumference of the rotor 205A so that the centering part 163A may rotate relative to the rotor 205A.

In this way, the ends of the clutch output unit 137A are supported with the clutch input unit 135A.

Also, an outer circumferential part of the second end of the clutch output unit 137A is supported with an inner circumferential part of the rotor 205A serving as a vertical wall of the clutch housing 143A.

Further, the second end of the clutch output unit 137A is supported with the ball bearing 179A on the clutch carrier 63A. An inner circumferential part of the second end of the clutch output unit 137A supports an outer circumferential part of the rear axle 5 (3).

At an axial outer position of the needle bearing 253, a seal 255 is arranged between the rotor 205A and the hollow shaft 155A. The seal 255 may be an X-ring to seal the clutch chamber 125A. In this way, each of the clutch chambers 125A is defined between the clutch input unit 135A and the clutch output unit 137A and is sealed with the seals 251 and 255 and plug 167.

Movement from the rear axle 5 (3) toward the power transfer/transmission apparatus 1A is restricted by a contact face 158 between the rear axle 5 and the clutch output unit 137A, the ball bearing 177, and a contact face 160 between the clutch input unit 135A and the output gear unit 55.

Even if excessive input occurs due to such movement of the rear axle, the input can be born by transferring the same from the tapered roller bearing 119 (117) to the gear carrier 61. The second end of the clutch input unit 135A is in contact with the clutch carrier 63A through the electromagnet 207A and the first end thereof is in contact with the output gear unit 55 through a contact face 160. Consequently, the clutch input unit 135A is surely positioned in axial directions.

The main clutch 139A has a plurality of outer plates 183A and a plurality of inner plates 185A. The outer plates 183A each are made of a steel thick plate without paper material or the like. The inner plates 185A each are made of a thin plate that is provided with paper material or a carbon sheet, or a carbon-coated thin plate.

At an end of the main clutch 139A, the outer plate 183A is in contact with and is received by the vertical wall 151A of the clutch housing 143A.

The clutch adjusting mechanism 59A includes, in addition to the main clutch 139A, a pilot clutch 193A, a ball cam 195A, a cam ring 197A, a pressure plate 199A, an armature 203A, the rotor 205A, and the electromagnet 207A for driving the pilot clutch 193A.

The first end of the clutch adjusting mechanism 59A is positioned by the vertical wall 151A that is axially in contact with the output gear unit 55. The second end of the clutch adjusting mechanism 59A is positioned by the rotor 205A serving as the second vertical wall of the clutch housing 143A that is axially in contact with the clutch carrier 63A through the ball bearing 179A, electromagnet 207A, and shim 182A.

<Lubrication of Three Chambers>

The sealed gear chamber 56A accommodates a drive pinion gear 91 and a ring gear 93. Each of the sealed couplings, i.e., the clutch adjusting mechanisms 57A and 59A accommodating the main clutch 139A are arranged in the sealed spaces 243. Each of the gear chamber 56 and clutch chambers 125A that are independent of one another contains lubricant.

Among these three independent chambers, there are arranged a seal 123 between the gear carrier 61 and the output gear unit 55, the seal 251 between the clutch housing 143A and the rotor 205A, the seal 255 between the clutch output unit 137A and the rotor 205A, and the plug 167 between the clutch input unit 135A and the clutch output unit 137A. These seals 123, 251, and 255 and plug 167 secure the sealed states of the three independent chambers.

<Sub-Assembly of Clutch Adjusting Mechanism>

The gear carrier 61 has the seal 123 between the support wall 69 (67) and the output gear unit 55, so that the gear chamber 56A may separately seal gear oil.

Each of the clutch adjusting mechanisms 57A and 59A has the above-mentioned configuration, and therefore, can be made as a sealed coupling of a sub-assembly as shown in FIG. 11.

Namely, the clutch carrier 63A has a fitting part 127 and a flange 129 that are at the axial inner end of the clutch carrier 63A and are fitted to the gear carrier 61. At the axial outer end, the clutch carrier 63A has the shaft support 130A that radially inwardly protrudes.

The clutch input unit 135A has the joint shaft 141A that is axially removably connected to the output gear unit 55 through splines by axially moving toward the output gear unit 55.

The output unit support 147A of the clutch input unit 135A rotatably supports, through the ball bearing 177, the first end of the clutch output unit 137A. The second end of the clutch output unit 137A is rotatably supported with the needle bearing 253 to the rotor 205A.

The electromagnet 207A is connected to the rotor 205A through the ball bearing 179A and is fixed to the clutch carrier 63A.

Each of the clutch adjusting mechanisms 57A and 59A assembled as a sub-assembly is installed by inserting the joint shaft 141A of the clutch input unit 135A into an end of the output gear unit 55 so that the splines 145 of the joint shaft 141A may engage with the inner splines 113 (111) of the output gear unit 55.

At the same time, the fitting part 127 of the clutch carrier 63A is fitted to the joint opening 88 (86) of the gear carrier 61 with the seal 133 interposed between them.

Thereafter, the flange 129 is fixed to the carrier joint 84 (83) of the gear carrier 61 with the bolts 131, thereby completing the installation of the sub-assembly, i.e., the clutch adjusting mechanism 59A (57A).

With respect to the clutch adjusting mechanism 59A (57A), the rear axle 5 (3) is inserted into an outer end of the hollow shaft 155A, so that the splines of the rear axle may engage with the inner splines 165 of the hollow shaft 155A.

<Engagement/Disengagement Control of Main Clutch>

The engagement/disengagement control of the main clutch 139A is carried out through the energization control of the electromagnet 207A.

Various sensors are mounted on the vehicle (FIG. 1) to detect road conditions and driving/steering conditions including starting, accelerating, and turning conditions. According to the detected conditions, a controller centrally controls the left and right electromagnets 207A.

When energized, the electromagnet 207A attracts the armature 203A and engages the pilot clutch 193A between the armature 203A and the rotor 205A to generate pilot torque. Through the pilot clutch 193A, the cam ring 197A is connected to the clutch housing 143A and tries to turn together with the clutch housing 143A.

At this time, the pressure plate 199A is connected through the clutch hub 157A to the rear axle 5 (3), and therefore, a relative rotation occurs between the cam ring 197A and the pressure plate 199A. As a result, the ball cam 195A generates thrust to axially separate the cam ring 197A and pressure plate 199A from each other.

The thrust is applied through a thrust bearing 213 to the rotor 205A, and on the other hand, is applied through the pressure plate 199A and main clutch 139A to the vertical wall 151A.

Consequently, the thrust is received by the clutch housing 143A, to adjustably engage the main clutch 139A between the pressure plate 199A and the vertical wall 151A.

When the electromagnet 207A is de-energized, the ball cam 195A loses the thrust, and therefore, the engagement of the main clutch 139A is released.

<Lubrication>

In the gear chamber 56, lubricant or gear oil is filled up to a level to immerse the whole width of the ring gear 93 at a lower part of the gear chamber 56. In each of the left and right clutch chambers 125A, lubricant or clutch oil is filled up to a level above the axis of rotation.

In the gear chamber 56, the ring gear 93 splashes the gear oil upward when the ring gear 93 is turned, to lubricate the meshing drive pinion gear 91 and ring gear 93 and tapered roller bearings 95 and 97.

In each clutch chamber 125A, the clutch oil between the clutch input and output units 135A and 137A lubricates each part.

Due to the sliding of the clutch plates of the main clutch 139A, the clutch adjusting mechanisms 59A (57A) may generate heat. The heat is taken by the clutch oil in the clutch chamber 125A and the heat of the clutch oil is passed to the clutch housing 143A and to the coolant, oil, or gas such as air in the space 243. The heat received by the coolant, oil, or gas such as air in the space 243 is discharged outside through the clutch carrier 63A and the like.

This configuration prevents the temperature increase of the clutch adjusting mechanism 59A (57A), to properly conduct clutch output control.

The temperature of the clutch adjusting mechanism 59A (57A) is measurable by arranging a temperature sensor such as a thermocouple in the space 243 to measure the temperature of the lubricant or gas in the space 243, or by arranging a temperature sensor on the gear carrier 61 or clutch carrier 63A to measure the temperature of the carrier 61 or 63A.

Effect of Second Embodiment

Like the first embodiment, the second embodiment can improve the stability of support of the clutch adjusting mechanisms 57A and 59A and the assembling easiness of the same.

The second embodiment employs the rotor 205A as the second vertical wall of the peripheral wall 150A to support, through the needle bearing 253, the second end of the clutch output unit 137A.

This configuration improves the stability of support of the clutch output unit 137A.

Third Embodiment

Figure 12:
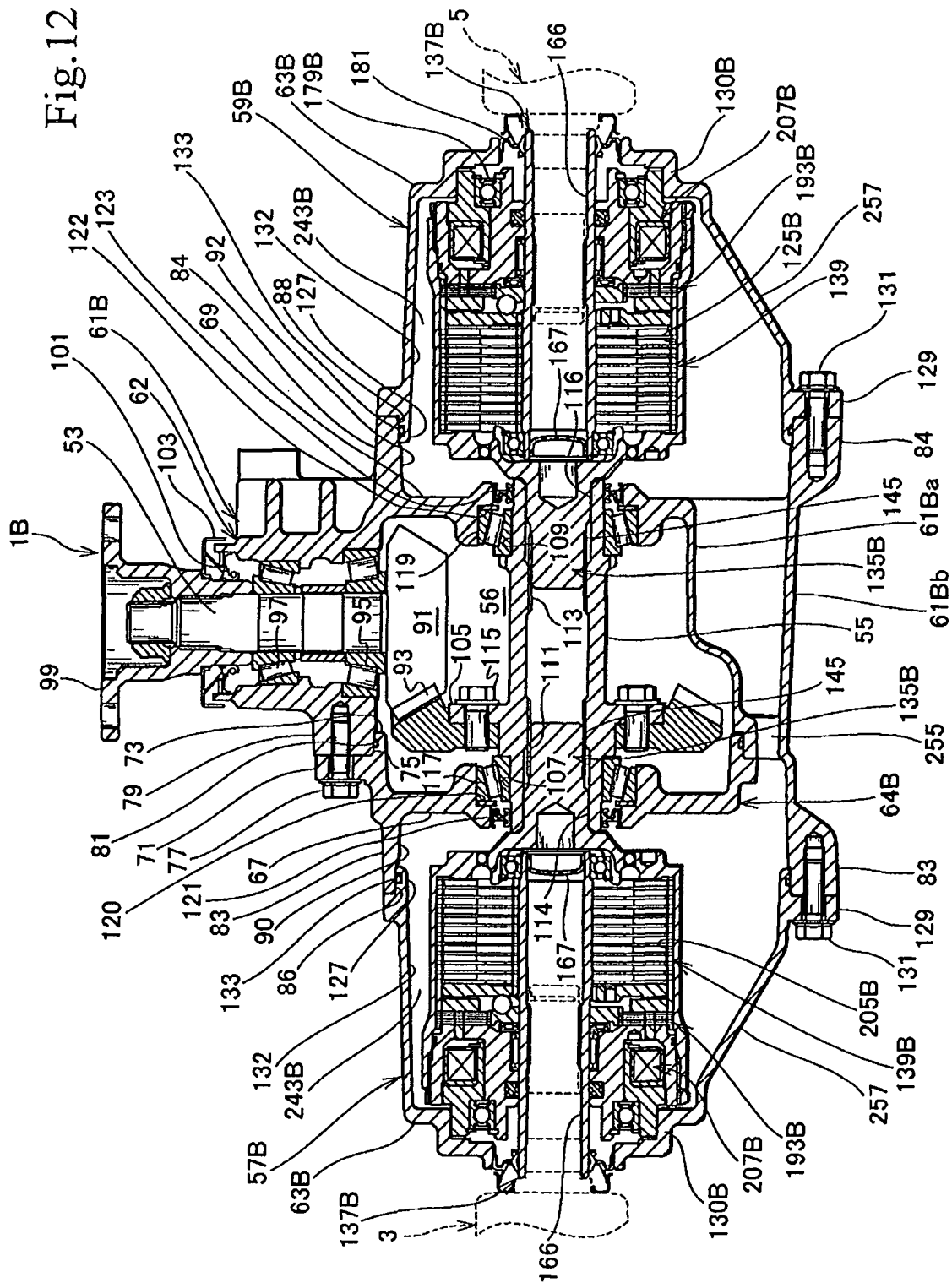
FIG. 12 is a sectional view showing a power transfer/transmission apparatus according to a third embodiment of the present invention.
Figure 13:
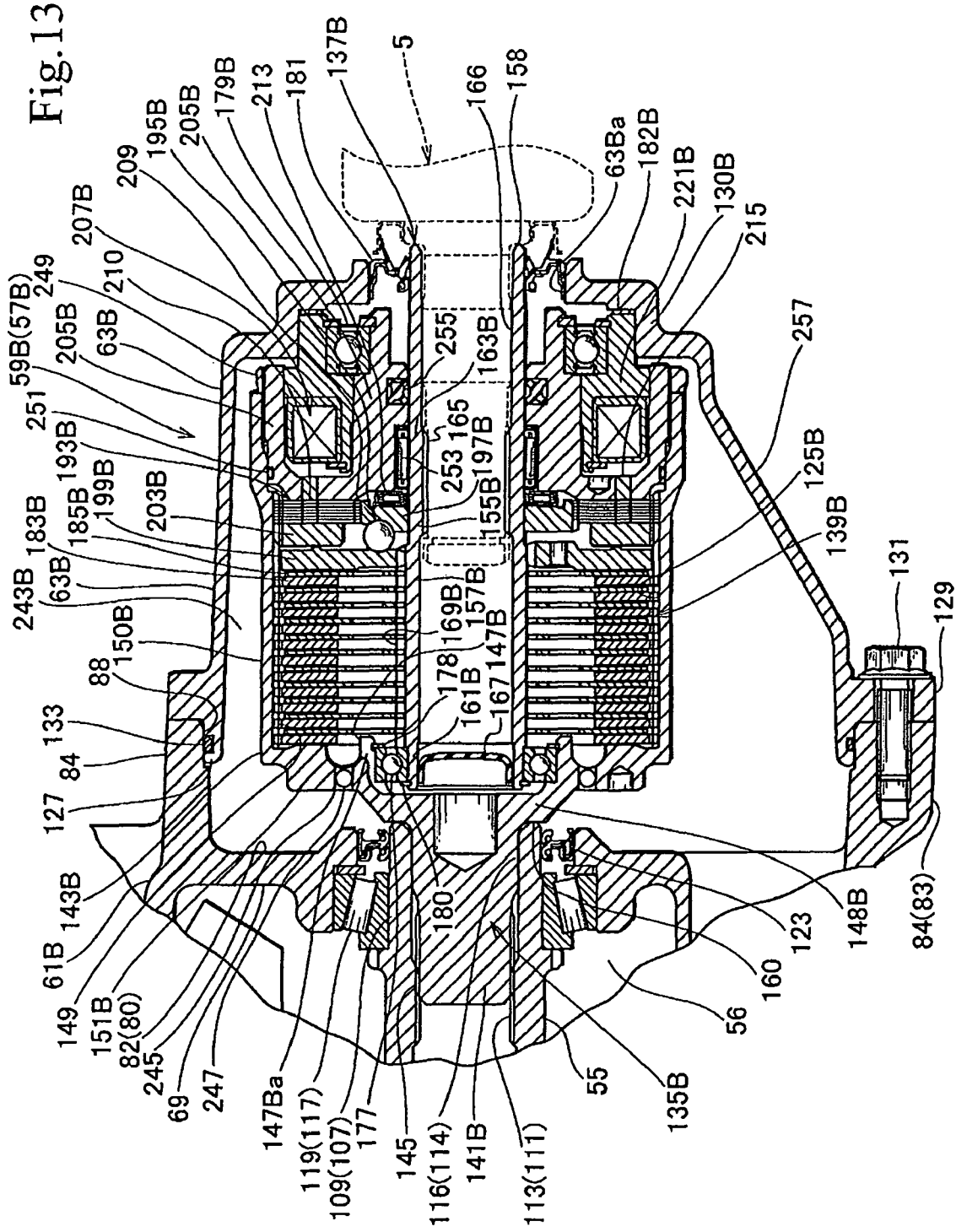
FIG. 13 is an enlarged sectional view showing a clutch adjusting mechanism of the apparatus according to the third embodiment.

FIG. 12 is a sectional view showing a power transfer/transmission apparatus according to the third embodiment of the present invention and FIG. 13 is an enlarged sectional view showing a clutch adjusting mechanism of the apparatus according to the third embodiment. The third embodiment is configured similar to the second embodiment, and therefore, employs the same reference marks as those of the second embodiment or the same reference marks plus "B" instead of "A" for the same or corresponding parts, to avoid repetitive explanation.

According to the power transfer/transmission apparatus 1B of the third embodiment, an output gear unit 55 has hollow joints 114 and 116 that have centering parts 107 and 109 and inner splines 111 and 113 formed on inner circumferential faces of the centering parts 107 and 109.

On the outer circumference of an end of a joint shaft 141B of a clutch input unit 135B, there are a flange 148B and a vertical wall 151B that are integrated to form a first vertical wall of an integral clutch housing 143B.

The clutch housing 143B has a second vertical wall served by a rotor 205B that is screwed to the clutch housing 143B. A nut 249 is fastened to prevent the unfastening of the rotor 205B.

An inner circumferential part of the rotor 205B supports, through a needle bearing 253, the outer circumference of a second end of a clutch output unit 137B.

An outer circumferential part of the second end of the clutch output unit 137B is supported with a ball bearing 179B on a clutch carrier 63B and an inner circumferential part thereof supports an outer circumferential part of a rear axle 5 (3). The rear axle 5 (3) extends through an opening 63Ba of the clutch carrier 63B and is connected to a rear wheel.

A first end (inner end) of a clutch adjusting mechanism 59B is positioned by the vertical wall 151B that is axially in contact with the output gear unit 55. A second end (outer end) of the clutch adjusting mechanism 59B is positioned by the rotor 205B serving as the vertical wall of the clutch housing 143B that is axially in contact with the clutch carrier 63B through the ball bearing 179B, an electromagnet 207B, and a shim 182B serving as a gap adjuster.

On the back of a gear carrier 61B, a closed inner wall 61Ba and a closed outer wall 61Bb are formed. Between the walls 61Ba and 61Bb, a path 255 is formed to connect left and right surrounding spaces 243B to each other. Between a top and bottom of the power transfer/transmission apparatus 1B, the path 255 extends along the outer wall 61Bb in a circumferential direction.

The gear carrier 61B has carrier joints 83 and 84 connected to the clutch carriers 63B, respectively. The carrier joints 83 and 84 are continuous to the outer wall 61Bb. Each clutch carrier 63B has a slant wall 257 to be connected to the carrier joint 84 (83). The slant wall 257 expands backward.

Each of the clutch adjusting mechanisms 57B and 59B has a main clutch 139B whose clutch plates slide to generate heat. The heat is taken by clutch oil in each clutch chamber 125B and the heat of the clutch oil is passed to the clutch housing 143B and to coolant, oil, or gas such as air in the space 243B.

The left and right spaces 243B are connected to each other through the path 255, to have an increased volume, so that heat in any one of the left and right clutch chambers 125B is distributed between the clutch chambers 125B through the coolant in the spaces 243B.

If the coolant is, for example, CFC's substitute, the coolant evaporates to take heat from the clutch chamber 125B that generates heat in the space 243B around the clutch chamber 125B. The evaporated coolant moves through the path 255 to the other space 243B around the lower temperature clutch chamber 125B where the coolant discharges heat and condenses, thereby realizing a heat pump cycle. This ensures the cooling of the clutch chambers 125B.

The slant walls 257 of the clutch carriers 63B expand the surrounding spaces 243B to improve the cooling effect.

Like the first embodiment, the third embodiment can improve the stability of support of the clutch adjusting mechanisms 57B and 59B and the assembling easiness of the same.

The third embodiment employs the rotor 205B as a vertical wall of a peripheral wall 150B to support, through the needle bearing 253, the second end of the clutch output unit 137B.

This configuration improves the stability of support of the clutch output unit 137B.

Fourth Embodiment

Figure 14:
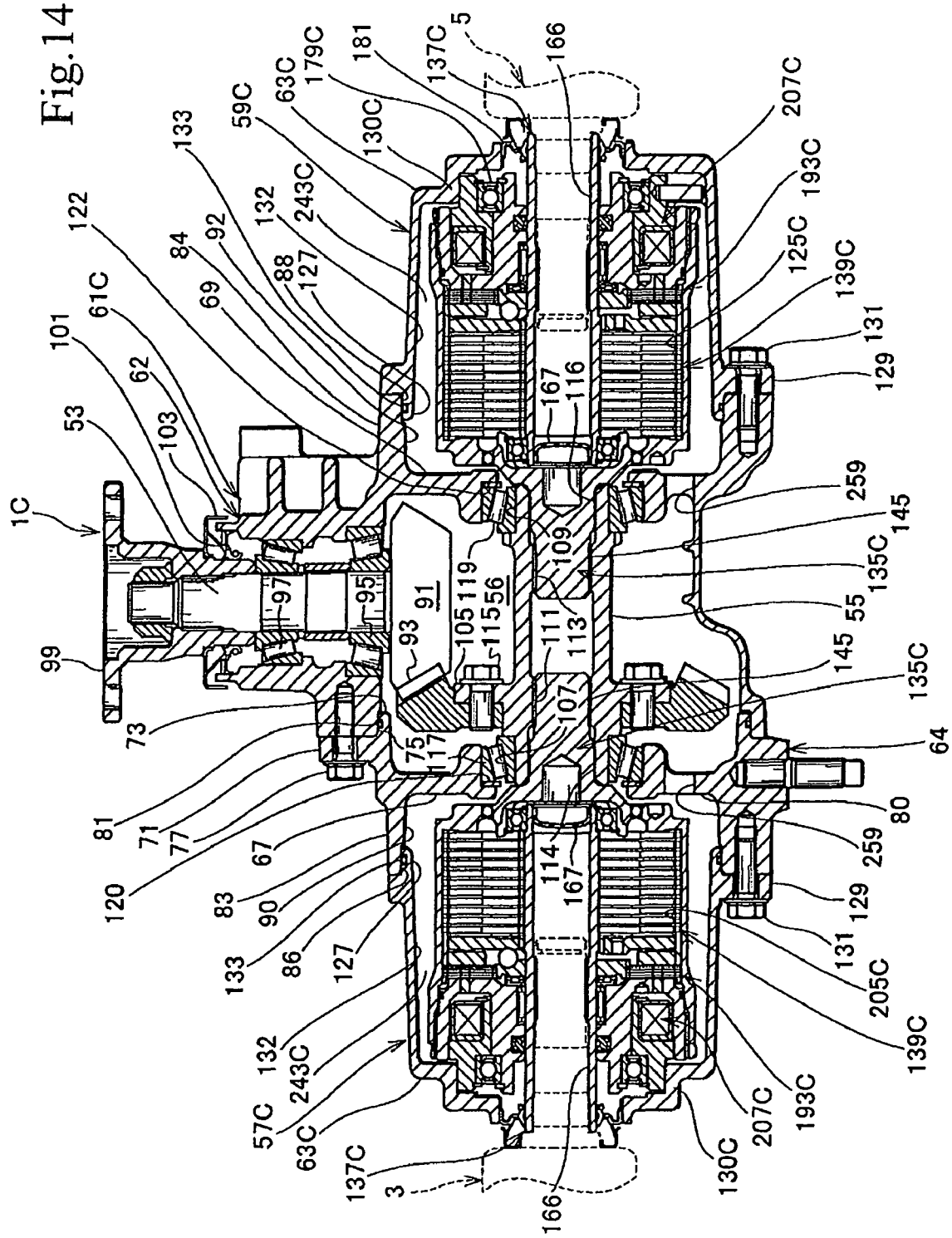
FIG. 14 is a sectional view showing a power transfer/transmission apparatus according to a fourth embodiment of the present invention.
Figure 15:
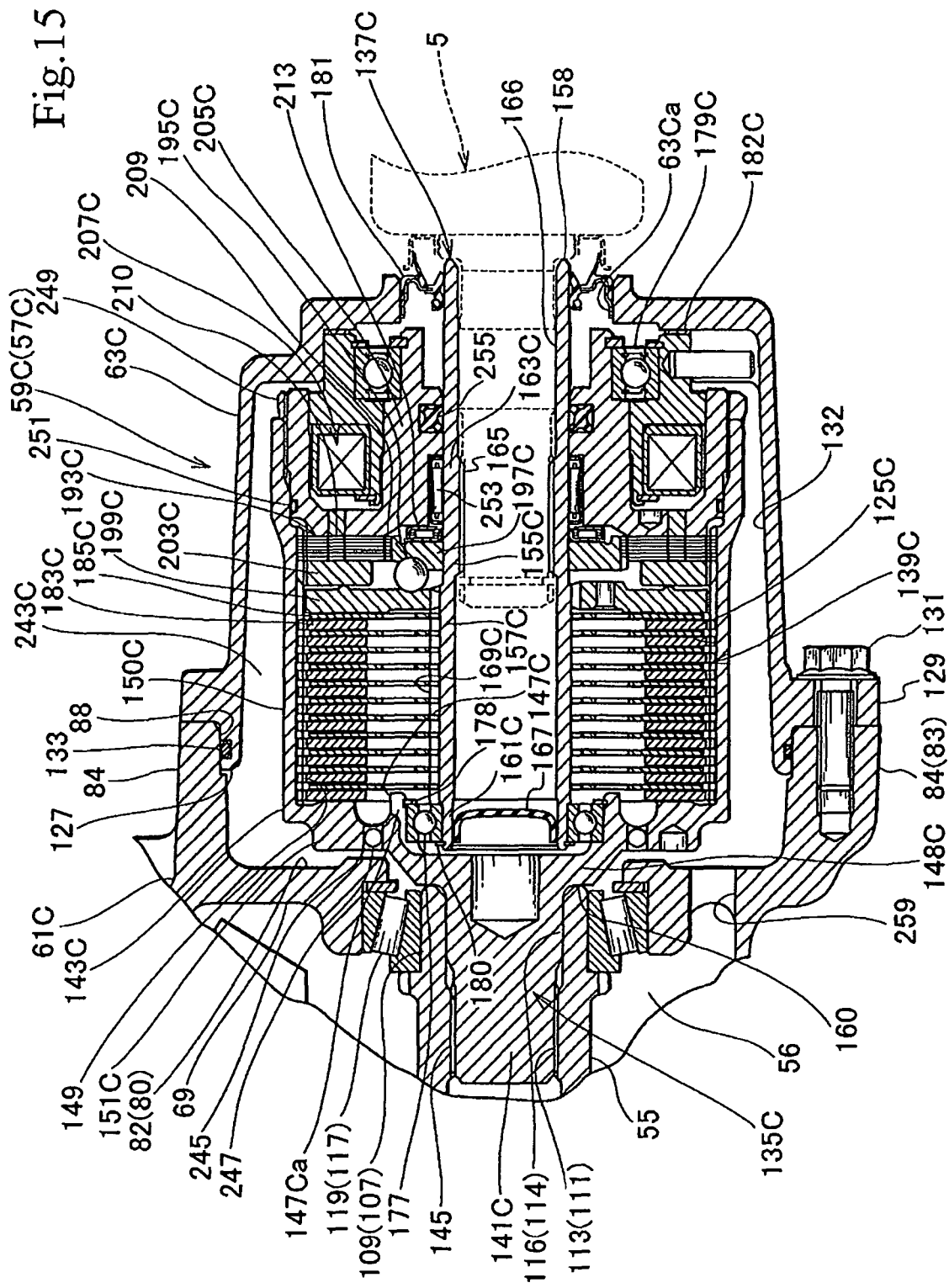
FIG. 15 is an enlarged sectional view showing a clutch adjusting mechanism of the apparatus according to the fourth embodiment.

FIG. 14 is a sectional view showing a power transfer/transmission apparatus according to the fourth embodiment of the present invention and FIG. 15 is an enlarged sectional view showing a clutch adjusting mechanism of the apparatus according to the fourth embodiment. The fourth embodiment is configured similar to the second embodiment, and therefore, employs the same reference marks as those of the second embodiment or the same reference marks plus "C" instead of "A" for the same or corresponding parts, to avoid repetitive explanation.

According to the power transfer/transmission apparatus 1C of the fourth embodiment, an output gear unit 55 has hollow joints 114 and 116 that have centering parts 107 and 109 and inner splines 111 and 113 formed on inner circumferential faces of the centering parts 107 and 109.

On the outer circumference of an end of a joint shaft 141C of a clutch input unit 135C, there are a flange 148C and a vertical wall 151C that are integrated to form a first vertical wall of an integral clutch housing 143C.

The clutch housing 143C has a second vertical wall served by a rotor 205C that is screwed to the clutch housing 143C. A nut 249 is fastened to prevent the unfastening of the rotor 205C.

An inner circumferential part of the rotor 205C supports, through a needle bearing 253, the outer circumference of a second end of a clutch output unit 137C.

An outer circumferential part of the second end of the clutch output unit 137C is supported with a ball bearing 179C on a clutch carrier 63C and an inner circumferential part thereof supports an outer circumferential part of a rear axle 5 (3). The rear axle 5 (3) passes through an opening 63Ca of the clutch carrier 63C and is connected to a rear wheel.

A first end (inner end) of a clutch adjusting mechanism 59C is positioned by the vertical wall 151C that is axially in contact with an output gear unit 55. A second end (outer end) of the clutch adjusting mechanism 59C is positioned by the rotor 205C serving as the second vertical wall of the clutch housing 143C that is axially in contact with the clutch carrier 63C through the ball bearing 179C, an electromagnet 207C, and a shim 182C serving as a gap adjuster.

Support walls 67 and 69 of the gear carrier 61 each have an opening 259 to connect the inside of each clutch carrier 63C to the inside of a gear chamber 56.

Lubricant is filled up to the level of an axis of rotation in each of the gear chamber 56, surrounding spaces 243C, and clutch chambers 125C.

This configuration allows the lubricant in the gear chamber 56 to flow to the clutch housings 143C of the clutch input units 135C, to properly cool the clutch adjusting mechanisms 57C and 59C and stabilize the operation of clutches. At the same time, this configuration suppresses the temperature increase of the lubricant in the gear chamber 56, prevents the deterioration of the lubricant, and properly feeds the lubricant to the meshing faces of input and output gears 91 and 93.

Like the second embodiment, the fourth embodiment can improve the stability of support of the clutch adjusting mechanisms 57C and 59C and the assembling easiness of the same.

The fourth embodiment employs the rotor 205C as a vertical wall of a peripheral wall 150C to support, through the needle bearing 253, the second end of the clutch output unit 137C.

This configuration improves the stability of support of the clutch output unit 137C.

What is claimed is:

1. A power transfer/transmission apparatus comprising:
an input gear unit and an output gear unit rotatably supported on a stationary carrier, and including two gears arranged on different axial lines and mesh with each other and through which the input gear unit and the output gear unit cooperate with each other;
a pair of clutch adjusting mechanisms that are connected to ends of the output gear unit, respectively, the clutch adjusting mechanisms each having a frictional multiplate clutch that is engaged/disengaged according to an energization control of an electromagnet to adjust output power;
a pair of axles connected to the clutch adjusting mechanisms, respectively, each of the axles passing through an opening of the stationary carrier and connected to a wheel;
hollow joints formed at the ends of the output gear unit and having an engaging portion on an inner periphery thereof;
a clutch input unit and a clutch output unit provided with each of the clutch adjusting mechanisms and between which the frictional multiplate clutch is arranged;
the clutch input unit rotating together with the output gear unit and having a first end disposed in an axial inner area proximal to the output gear unit in an axial direction thereof and a second end disposed in an axial outer area opposite to the first end in the axial direction and extending across the frictional multiplate clutch, whereby the frictional multiplate clutch is axially interposed between the first and second ends, the clutch input unit comprising,
a joint shaft formed at the first end of the clutch input unit and comprising a solid construction so as to have an engaged portion on an outer periphery thereof that is spline-engaged with the engaging portion of the hollow joint such that the joint shaft is inserted into, connected to and rotating together with the hollow joint of the output gear unit,
a clutch housing connected to and rotating together with the joint shaft, the clutch housing including a first vertical wall connected to the joint shaft and a circumferential wall enclosing the frictional multiplate clutch and connected to the first vertical wall, and
an output unit support formed on the first vertical wall and disposed outwardly from the engaged portion of the joint shaft in the axial direction to rotatably support a first end of the clutch output unit in a radial direction of the output gear unit through a first bearing at a position that is axially different from the position of the joint shaft,
a supported portion formed on the second end of the clutch input unit that is supported by the electromagnet in the radial direction through a second bearing, and
a supporting portion being formed on the second end of the clutch input unit and rotatably supporting a second end of the clutch output unit in the radial direction through a third bearing;
the clutch output unit including a hollow axle joint formed on an inner periphery thereof at the second end of the clutch output unit, the hollow axle joint into which a respective one of the pair of axles is inserted and connected such that the clutch output unit and the respective one axle may rotate together;
the first end of the clutch input unit being supported to the carrier in the radial direction through the output gear unit and a fourth bearing supporting the output gear unit and by insertion and connection of the joint shaft to the hollow joint;
the second end of the clutch input unit supported to the carrier in the radial direction through the supported portion,
the first end of the clutch output unit supported to the clutch input unit in the radial direction through the first bearing supporting the first end of the clutch output unit and the output unit being supported at a position axially outwardly from the connection position at which the joint shaft is spline-engaged with the hollow joint; and
the second end of the clutch output unit supported to the clutch input unit in the radial direction through the second bearing supporting the second end of the clutch output unit and the supporting portion at a position axially outwardly from the frictional multiplate clutch.

2. The apparatus of claim 1, further comprising:
the second bearing is arranged between an outer circumferential part of the second end of the clutch output unit and the stationary carrier so that the outer circumferential part of the second end of the clutch output unit is supported with the bearing on the stationary carrier; and
the hollow axle joint formed on an inner circumferential part of the clutch output unit and supporting the outer circumferential part of the axle.

3. The apparatus of claim 1, further comprising:
a second vertical wall connected to a second end of the circumferential wall of the clutch housing; and
an inner circumferential part of the second vertical wall supporting an outer circumferential part of the second end of the clutch output unit.

4. The apparatus of claim 3, wherein:
the stationary carrier comprising,
a gear carrier supporting the input gear unit and output gear unit,
clutch carriers accommodating the clutch adjusting mechanisms, respectively;
at a first end of the clutch adjusting mechanism, the first vertical wall being axially in contact with the output gear unit and positioned thereby; and at a second end of the clutch adjusting mechanism, the second vertical wall being axially in contact with the clutch carrier through a gap adjuster and positioned thereby.

5. The apparatus of claim 1, wherein:
the stationary carrier comprising,
- a gear carrier supporting the input gear unit and output gear unit,
- clutch carriers accommodating the clutch adjusting mechanisms, respectively;

at a first end of the clutch adjusting mechanism, the first vertical wall being axially in contact with the output gear unit and positioned thereby; and at a second end of the clutch adjusting mechanism, the clutch output unit being axially in contact with the clutch carrier through a gap adjuster and positioned thereby.

6. The apparatus of claim 1, wherein:
the hollow axle joint is defined and closed by a closing member in an inside of the clutch output unit, and a seal is arranged between the clutch output unit and the stationary carrier.

* * * * *